US012684424B2

(12) United States Patent (10) Patent No.: US 12,684,424 B2
Li et al. (45) Date of Patent: Jul. 14, 2026

(54) METHOD AND DEVICE FOR CHANGING SERVING ENTITY

(71) Applicant: Samsung Electronics Co., Ltd., Suwon-si (KR)

(72) Inventors: Lisi Li, Beijing (CN); Hong Wang, Beijing (CN); Lixiang Xu, Beijing (CN); Yiran Jin, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 639 days.

(21) Appl. No.: 18/040,798

(22) PCT Filed: Aug. 6, 2021

(86) PCT No.: PCT/KR2021/010386
§ 371 (c)(1),
(2) Date: Feb. 6, 2023

(87) PCT Pub. No.: WO2022/031098
PCT Pub. Date: Feb. 10, 2022

(65) Prior Publication Data
US 2023/0362741 A1 Nov. 9, 2023

(30) Foreign Application Priority Data

Aug. 6, 2020 (CN) .......................... 202010785075.0

(51) Int. Cl.
*H04W 36/00* (2009.01)
*H04W 36/32* (2009.01)

(52) U.S. Cl.
CPC ... *H04W 36/0016* (2013.01); *H04W 36/0072* (2013.01); *H04W 36/322* (2023.05)

(58) Field of Classification Search
None
See application file for complete search history.

(56) References Cited

U.S. PATENT DOCUMENTS

| | | | |
|---|---|---|---|
| 2013/0070726 A1 | 3/2013 | Zhang et al. | |
| 2014/0308956 A1* | 10/2014 | Zhang | H04W 36/0072 |
| | | | 455/436 |
| 2018/0324653 A1 | 11/2018 | Nagaraja et al. | |
| 2019/0028942 A1* | 1/2019 | Tang | H04W 36/0077 |
| 2020/0037208 A1* | 1/2020 | Futaki | H04W 76/15 |
| 2020/0305094 A1* | 9/2020 | Ouchi | H04W 52/325 |
| 2020/0351730 A1* | 11/2020 | Park | H04W 36/0077 |
| 2022/0248286 A1* | 8/2022 | Sedin | H04W 36/00835 |

(Continued)

FOREIGN PATENT DOCUMENTS

WO 2019158801 A1 8/2019

OTHER PUBLICATIONS

International Search Report and Written Opinion of the International Searching Authority dated Nov. 29, 2021, in connection with International Application No. PCT/KR2021/010386, 8 pages.

(Continued)

*Primary Examiner* — Nicholas Sloms

(57) ABSTRACT

The invention provides a method for changing a serving entity, which comprises the following steps: sending, by a first entity, a first message to a second entity; receiving, by the first entity, a second message from the second entity; and sending, by a first entity, a third message to UE.

20 Claims, 9 Drawing Sheets

(56) References Cited

U.S. PATENT DOCUMENTS

| | | | |
|---|---|---|---|
| 2022/0295480 A1* | 9/2022 | Xu | H04L 5/0091 |
| 2022/0312283 A1* | 9/2022 | Chen | H04W 36/0016 |
| 2025/0159566 A1* | 5/2025 | Deenoo | H04B 7/18513 |
| 2025/0274891 A1* | 8/2025 | Mahalingam | H04B 7/1851 |

OTHER PUBLICATIONS

3GPP TS 36.300 V16.2.0 (Jul. 2020), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16), Jul. 2020, 390 pages.

* cited by examiner

FIG. 3

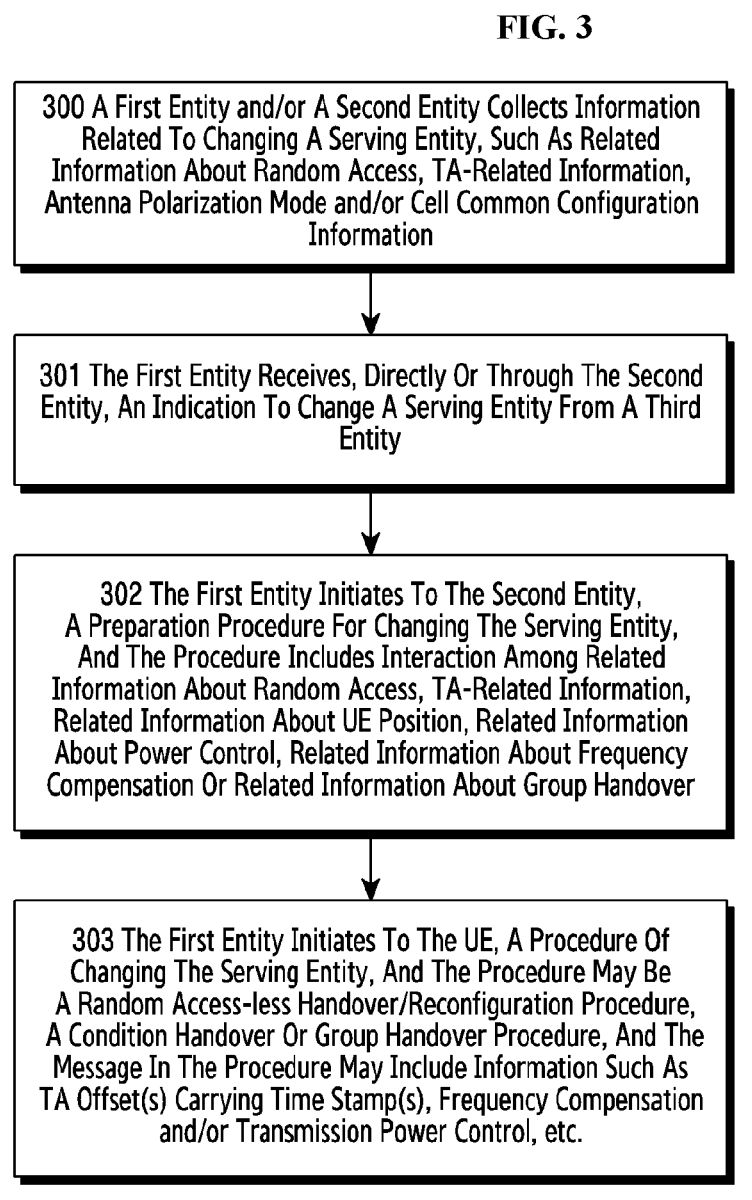

300 A First Entity and/or A Second Entity Collects Information Related To Changing A Serving Entity, Such As Related Information About Random Access, TA-Related Information, Antenna Polarization Mode and/or Cell Common Configuration Information 301 The First Entity Receives, Directly Or Through The Second Entity, An Indication To Change A Serving Entity From A Third Entity 302 The First Entity Initiates To The Second Entity, A Preparation Procedure For Changing The Serving Entity, And The Procedure Includes Interaction Among Related Information About Random Access, TA-Related Information, Related Information About UE Position, Related Information About Power Control, Related Information About Frequency Compensation Or Related Information About Group Handover 303 The First Entity Initiates To The UE, A Procedure Of Changing The Serving Entity, And The Procedure May Be A Random Access-less Handover/Reconfiguration Procedure, A Condition Handover Or Group Handover Procedure, And The Message In The Procedure May Include Information Such As TA Offset(s) Carrying Time Stamp(s), Frequency Compensation and/or Transmission Power Control, etc.

| UE | First Entity | Second Entity | Third Entity |

1200. Measurement
Configuration

Link Switch Over Triggering

1201a. Link Switch
Over Indication

Target Entity ID

1201b. Link Switch Over Indication

Source Entity ID

1202. Link Switch
Over Indication

1203. Handover or Reconfiguration Preparation and Execution

1300

| 1301 Transceiver Unit | 1302 Processor | 1303 Memory |

METHOD AND DEVICE FOR CHANGING SERVING ENTITY

CROSS-REFERENCE TO RELATED APPLICATIONS

This application is a 371 National Stage of International Application No. PCT/KR2021/010386, filed Aug. 6, 2021, which claims priority to Chinese Patent Application No. 202010785075.0, filed Aug. 6, 2020, the disclosures of which are herein incorporated by reference in their entirety.

BACKGROUND

1. Field

The application relates to the field of communication, and in particular, relates to a method and a device for changing a serving entity.

2. Description of Related Art

In order to meet the increasing demand for wireless data communication services since the deployment of 4G communication systems, efforts have been made to develop improved 5G communication system or pre-5G communication system. Therefore, the 5G or the pre-5G communication system is also called "super 4G network" or "post-LTE system".

Wireless communication is one of the most successful innovations in modern history. Recently, the number of subscribers of wireless communication service has exceeded 5 billion, and it continues to grow rapidly. With the increasing popularity of smart phones and other mobile data devices (such as tablet computers, notebook computers, netbooks, e-book readers and machine-type devices) in consumers and enterprises, the demand for wireless data services is growing rapidly. In order to meet the rapid growth of mobile data services and to support new applications and deployments, it is very important to improve the efficiency and expand the coverage of wireless interfaces.

The 5G communication system is implemented in a higher frequency (e.g., millimeter wave, mmWave) band (such as 60 GHz band) to achieve higher data rate. In order to reduce the transmission loss of radio waves and increase the transmission distance, beam forming, large-scale multiple-input multiple-output (MIMO), full-dimensional MIMO (FD-MIMO), array antenna, analog beam forming, large-scale antenna and other technologies are discussed in the 5G communication system.

In addition, in the 5G communication system, based on advanced cells, cloud radio access network (RAN), ultra dense network, device-to-device (D2D) communication, wireless backhaul, mobile network, cooperative communication, cooperative multipoint (CoMP), receiver interference cancellation, etc., the development of improved system network is underway.

In 5G systems, hybrid FSK and QAM modulation (FQAM) and sliding window superposition coding (SWSC) have been developed as advanced coding modulation (ACM), and filter bank multicarrier (FBMC), non-orthogonal multiple access (NOMA) and sparse code multiple access (SCMA) have been developed as advanced access technologies.

Compared with the 5G system, 6G system can be implemented in higher frequency band to achieve higher data rate.

As estimated by the International Telecommunication Union (ITU), in 2020, the global monthly mobile data traffic will reach 62 Exa Bytes (EB, 1 EB=2^30 GB), and from 2020 to 2030, the service of global mobile data traffic will grow at an annual rate of about 55%. In addition, the proportion of video services and machine-to-machine communication services in mobile data services will gradually increase. It is estimated that in 2030, the scale of the video service will be six times that of the non-video service, and the machine-to-machine communication service will account for about 12% of the mobile data service (see "IMT traffic estimates for the years 2020 to 2030, Report ITU-R M.2370-0").

SUMMARY

The embodiment of the disclosure provides a method for changing a serving entity, which comprises the following steps: sending, by a first entity, a first message to a second entity; receiving, by a first entity, a second message from a second entity; and sending, by a first entity, a third message to UE.

In an implementation, the first message includes timing advance TA assistance information and/or user equipment (UE) position information; the second message includes TA offset information for handover of the UE to the second entity determined based on the TA assistance information and/or the UE position information; and the third message includes the TA offset information.

In an implementation, the TA assistance information includes at least one of: a feeder link delay about the first entity, geographic position information of a gateway of non-terrestrial access network (NTN) connected by the first entity, information for indicating a TA value of the UE with respect to the first entity, time stamp corresponding to the TA assistance information; and wherein the UE position information includes at least one of: a beam identify (ID) used by the UE under the first entity, and information indicating geographic position of the UE and the corresponding time stamp.

In an implementation, the first message further includes at least one of power control information and frequency offset information; and the second message further includes TPC and/or frequency offset information about the second entity determined based on at least one of the power control information and the frequency offset information.

In an implementation, the power control information includes a power headroom report (PHR) or a received power spectral density.

In an implementation, the first message is one of: a satellite connection request message, a handover request message, a handover required message, a UE context modification required message, an uplink RRC message transfer message; the second message is one of: satellite connection response message transfer, handover request acknowledgment message, and UE context modification request message; and the third message is a message including a handover command or a system information.

In an implementation, sending, by the first entity, the first message including a timing advance (TA) assistance information and/or the user equipment (UE) position information to the second entity, comprises: receiving, by the first entity, a fourth message including the timing advance (TA) assistance information or the user equipment (UE) position information from a secondary node; and sending, by the first entity, the first message to the second entity.

In an implementation, the fourth message is a changing secondary node required message, the first message is an secondary node addition request, and the second message is an secondary node addition request acknowledgment.

In an implementation, the TA assistance information is obtained through the following steps: sending, by a central control entity (CU) corresponding to the first entity, a request for the TA assistance information to a distributed entity (DU) corresponding to the first entity; and receiving, by the CU, response of the TA assistance information from the DU.

In an implementation, the first message includes a random access configuration request, the second message includes a random access configuration of the second entity, and the third message includes handover conditions based on the random access configuration of the second entity, and the handover conditions are determined by the first entity based on the random access configuration of the second entity.

In an implementation, the random access configuration includes at least one of: a number of preambles for contention-based random access (CBRA); a number of preambles for system information; a number of preambles for contention free random access (CFRA); random access (RA) occasions; PRACH configuration indexes; msg1—frequency division multiplexing.

In an implementation, the first message includes a first list indicating position information of one or more UE, the second message includes a second list of handover conditions for each of the one or more UE, and the third message is used to indicate the handover conditions included in the second list, and the handover conditions are determined by the second entity based on the random access configuration of the second entity and the position information of the UE.

In an implementation, the position information includes the beam ID used by the UE under the first entity and/or the geographic position information of the UE.

In an implementation, the second list further includes random access configuration information of each UE, and the third message is further used to indicate random access configuration information of each UE included in the second list.

In an implementation, the first message is one of: an Xn setup request message, an NG-RAN configuration update message, a satellite connection request message, a message for requesting satellite handover, or a message for requesting group handover preparation; and the second message is one of: an Xn setup response message, an NG-RAN configuration update acknowledgment message, a satellite connection response message, a message for acknowledging a request for satellite handover, or a message for acknowledging a request for group handover preparation.

In an implementation, the first message includes a list of serving cells and a request for the TA assistance information of the second entity, and the list of serving cells includes coverage configuration information of one or more serving cells of the first entity; the second message is used to response the TA assistance information of the second entity to the first entity; and the third message includes TA offset information common to the UE determined based on the received second message.

In an implementation, the TA assistance information includes information indicating a feeder link delay between the second entity and a third entity connected to the first entity, or position information of an NTN gateway connected to the second entity.

In an implementation, the first message is a satellite connection request message or a message for requesting satellite handover, the second message is a satellite connection response message or a message for acknowledging a request for satellite handover; and the third message is a system information.

In an implementation mode, the first message includes a request for common configuration information of a layer of the second entity, and the second message includes response on the common configuration information of the second entity, and the method further comprises: sending, by the first entity, a fourth message including a first list of UE requesting handover to the second entity; receiving, by the first entity, a fifth message including a second list of the UE requesting handover from the second entity; and sending, by the first entity, specific configuration information of each UE of the UE requesting handover determined based on the received fourth message to the each UE.

In an implementation, the layer is at least one of the following: a service adaptation application protocol SDAP layer, a packet data convergence protocol PDCP layer, a radio link control layer RLC, a medium access control MAC layer, or a physical layer.

In an implementation, the second message includes at least one of the following: a resource block RB configuration list, MAC layer configuration parameters or physical layer configuration parameters, wherein each item in the RB configuration list includes at least one of the following: an RB configuration index, SDAP layer configuration parameters, PDCP layer configuration parameters and RLC layer configuration parameters, wherein, each item in the first list includes an UE ID within interface or dedicated configuration parameters of the UE including information of bearers used or requested by the UE, and each item in the second list includes at least one of the following: a new UE ID within interface, a new UE ID, a configuration index of bearers requested by the UE, or dedicated configuration of the UE of other dedicated configuration indicating that the UE is not within the scope of the configuration index.

In an implementation, the first message is one of the following: a message for requesting common configuration, an NG-RAN configuration update message, a satellite connection request message, a message indicating preparation for satellite connection, or a message indicating preparation for group handover; the second message is one of the following: a message for responding common configuration, an NG-RAN configuration update acknowledgment message, a satellite connection response message, a message for acknowledging preparation of satellite connection, or a message for acknowledging preparation of group handover; the third message includes a system information; the fourth message is one of the following: a message for requesting group handover, a message for requesting satellite handover or a satellite connection request message; and the fifth message is one of the following: a message for acknowledging the request for group handover, a message for acknowledging the request for satellite handover, or a satellite connection response message.

In an implementation, the method according to the embodiment of the present disclosure further comprises: sending, by a first entity, a sixth message indicating a measurement configuration to a third entity; and receiving, by the first entity, a seventh message which includes the second entity ID and is for indicating a change of a serving entity from the third entity, wherein the sixth message includes at least one of the following: a measurement object, a measurement event and a reporting configuration, and the seventh message includes at least one of the following: a measurement object, a measurement result or a handover/ reconfiguration indication, and the sixth message is one of the following: an NG setup response message, an NG resume response message, an AMF configuration update message, an F1 setup response message, a GNB-CU configuration update message, a GNB-DU resource cooperation request message, an F1 resume response message, or a message for satellite measurement configuration, and the seventh message is one of the following: a measurement report message, a message for link measurement report, a link change indication message, or a message for indicating GNB-DU state.

In an implementation, the method according to the embodiment of the present disclosure further comprises: receiving, by a first entity, an indication for a serving entity change including a first entity ID from a second entity, wherein the indication is sent to the first entity by the second entity after the second entity receives an eighth message for indicating the serving entity change including the first entity ID sent by a third entity connected to the first entity, wherein the eighth message is one of the following: an NG setup request message, an NG resume request message, an F1 setup request message and an F1 resume request message.

An embodiment of the present disclosure also provides a device for changing a serving entity, including: a transceiver configured to receive signals and send signals; a memory configured to store data and instructions; and a controller configured to execute the method according to the embodiment of the present disclosure.

BRIEF DESCRIPTION OF THE DRAWINGS

FIG. 3 illustrates an example flowchart of a method and a device for changing a serving entity according to an embodiment of the present disclosure;

DETAILED DESCRIPTION

FIG. 1 to FIG. 13 discussed below and various embodiments for describing the principles of the disclosure in this patent document are only for illustration and should not be interpreted as limiting the scope of the disclosure in any way. Those skilled in the art will understand that the principles of the present disclosure may be implemented in any properly arranged system or device.

Figures 1, 2:
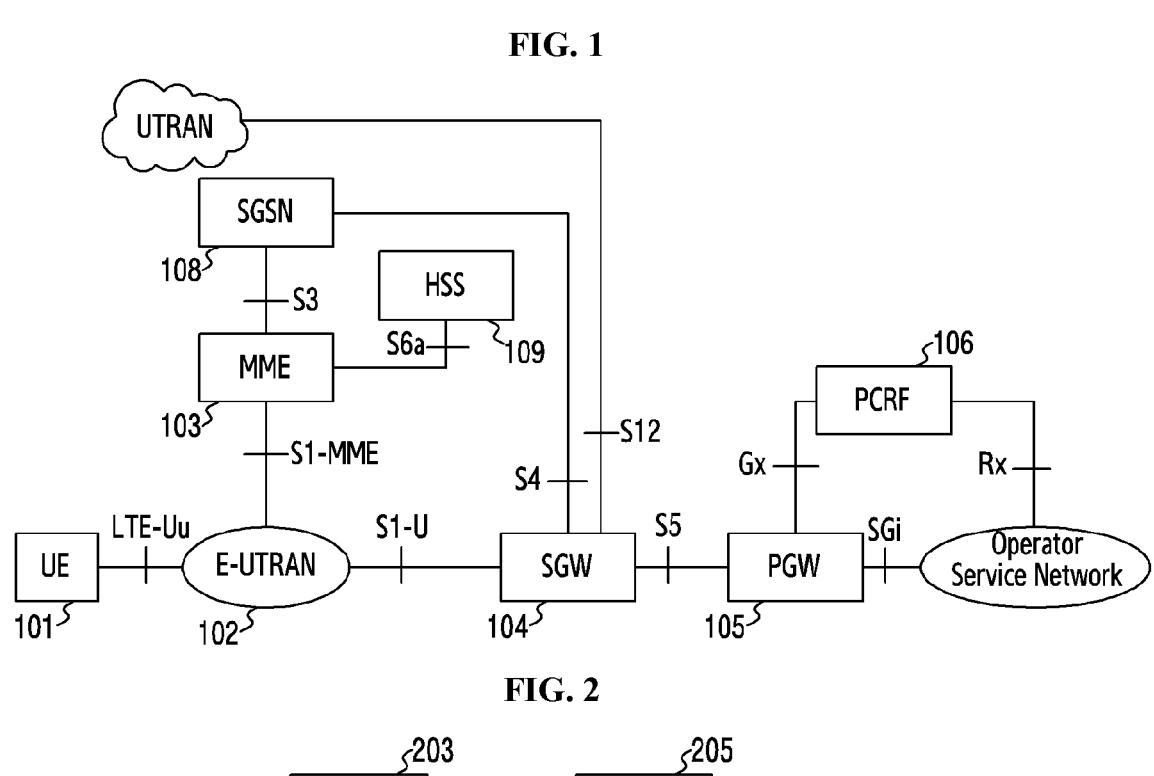
FIG. 1 is an exemplary system architecture of system architecture evolution (SAE)
FIG. 2 is an exemplary system architecture according to various embodiments of the present disclosure.

FIG. 1 is an exemplary system architecture 100 of system architecture evolution (SAE). User equipment (UE) 101 is a terminal device for receiving data. An evolved universal terrestrial radio access network (E-UTRAN) 102 is a radio access network, which includes a macro base station (eNodeB/NodeB) that provides UE with interfaces to access the radio network. A mobility management entity (MME) 103 is responsible for managing mobility context, session context and security information of the UE. A serving gateway (SGW) 104 mainly provides functions of user plane, and the MME 103 and the SGW 104 may be in the same physical entity. A packet data network gateway (PGW) 105 is responsible for functions of charging, lawful interception, etc., and may be in the same physical entity as the SGW 104. A policy and charging rules function entity (PCRF) 106 provides quality of service (QoS) policies and charging criteria. A general packet radio service support node (SGSN) 108 is a network node device that provides routing for data transmission in a universal mobile telecommunications system (UMTS). A home subscriber server (HSS) 109 is a home subsystem of the UE, and is responsible for protecting user information including a current location of the user equipment, an address of a serving node, user security information, and packet data context of the user equipment, etc.

FIG. 2 is an exemplary system architecture 200 according to various embodiments of the present disclosure. Other embodiments of the system architecture 200 can be used without departing from the scope of the present disclosure.

User equipment (UE) 201 is a terminal device for receiving data. A next generation radio access network (NG-RAN) 202 is a radio access network, which includes a base station (a gNB or an eNB connected to 5G core network 5GC, and the eNB connected to the 5GC is also called ng-gNB) that provides UE with interfaces to access the radio network. An access control and mobility management function entity (AMF) 203 is responsible for managing mobility context and security information of the UE. A user plane function entity (UPF) 204 mainly provides functions of user plane. A session management function entity SMF 205 is responsible for session management. A data network (DN) 206 includes, for example, services of operators, access of Internet and service of third parties.

With a growing demand for the development of wireless technology, in the 5G architecture, the functional modules originally located on the same base station are separated. Among them, some functional modules are closer to users, while others are pool grouped and virtualized for centralized deployment. That is to say, the base station may be divided into two parts, one of which is a Central Unit (CU) and the other is a Distributed Unit (DU). The DU is closer to users, while the CU, far away from antennas, can support multi-antenna connection and improve network performance. A CU may connect multiple DUs, and the functions on the CU can be virtualized. The CU and the DU are connected through F1 interface, which is also called fronthaul interface or fronthaul connection. Functions of RRC (Radio Resource Control) and PDCP (Packet Data Convergence Protocol) are implemented on the CU, and functions of RLC (Radio Link Control), MAC (Media Access Control) and physical layer are implemented on the DU.

In recent years, the mobile communication industry has greater interest in and is more widely engaged in satellite communication industry. Under the environment of mobile communication (such as 5G and 6G), the integrated infrastructure of satellite and ground network has a potential market. NTN (Non-Terrestrial Radio Access Network) refers to a network or a part of a network that communicates by using airborne or no-load signal transceivers, wherein the no-load signal transceiver may be, for example, a satellite, which can, according to different heights of the orbit where the satellite is located, be divided into Low Earth Orbit Satellites (LEO), Medium Earth Orbit Satellites (MEO), Earth Orbit Satellites (GEO) or High Elliptical Orbit Satellites (HEO), etc.; the airborne signal transceiver may be, for example, a High Altitude Platform (HAPS), including an Unmanned Aerial System (UAS), such as an unmanned Lighter than Air (LTA) and an unmanned Heavier than Air (HTA), whose usual working orbits are in the air 8 km to 50 km from the ground.

An NTN usually includes the following functional network elements: a no-load/airborne signal transceiver in transparent transmission or regenerative load mode (such as a satellite, an unmanned aerial vehicle, etc.); one or more ground NTN gateways for connecting NTN and common data networks; a feeder link between the ground NTN gateway and the no-load/airborne signal transceiver (such as a satellite, an unmanned aerial vehicle, etc.); a service link connecting UE and a no-load/airborne signal transceiver (such as a satellite, an unmanned aerial vehicle, etc.); in addition, in the scenario of satellite constellation, there may also be multiple inter-satellite connections.

The NTN can accelerate the promotion of 5G services and improve the performance of terrestrial networks in areas with no or insufficient services, and can provide service continuity and enhance service reliability for user equipment or mobile platforms (such as vehicles, airplanes, ships, high-speed trains or buses, etc.), and improve service availability anywhere, especially for key communication, such as future railway communication, ocean communication or aviation communication. In addition, the NTN can also transmit data to the network edge or directly to the user equipment through efficient multicast/broadcast resources, thus realizing the scalability of the 5G network.

Exemplary embodiments of the present disclosure are further described below with reference to the accompanying drawings.

The text and drawings are provided as examples only to help understand the present disclosure, and should not be interpreted as limiting the scope of this disclosure in any way. Although certain embodiments and examples have been provided, based on the disclosure herein, it will be apparent to those skilled in the art that changes may be made to the illustrated embodiments and examples without departing from the scope of the disclosure.

In the embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

The method and device for changing a serving entity provided by the present disclosure can support or contribute to link switch over in a network such as an NTN. In the NTN network, for example, the mobility, load balance, or link maintenance of no-load/airborne signal transceiver, will cause link switch over such as feeder link switch over, and a large number of users need a handover or reconfiguration simultaneously with the change of entities serving UE before and after switch over. According to the method and/or device for changing the serving entity provided by the present disclosure, the problems of insufficient random access resources and a large amount of signaling loads caused by simultaneous handover or reconfiguration of a large number of UE can be solved by pre-obtained assistance information (such as TA (timing advance)-related information, frequency offset information, power control information, random access configuration information, etc.) combined with various methods (such as random-access-less handover or reconfiguration, enhanced condition handover and/or group handover, etc.). According to the method and/or device for changing the serving entity in the embodiment of the disclosure, the problems of handover failure or reconfiguration failure and long time delay caused by insufficient resources are avoided, and the signaling load on the interface is reduced, thus ensuring the user experience and saving the cost of operators.

In the following description, the NTN is taken as an example to describe a network, however, the network is not limited to this and may be any existing network or future network. In the following description, a satellite is taken as an example to describe a spaceborne/no-load signal transceiver, however, the signal transceiver is not limited to this and may be any existing signal transceiver or future signal transceiver. In the following description, the NTN gateway is taken as an example to describe a ground transceiver, however, the signal transceiver is not limited to this and may be any existing signal transceiver or future signal transceiver.

For example, as an exemplary description of a scenario to which this disclosure can be applied (it should be noted that the following description is only an example of a scenario to which this disclosure can be applied, and the scenario to which this disclosure can be applied is not limited to the following description), generally, UE is connected to a satellite through a service link, and the satellite is connected to an NTN gateway through a feeder link, and the UE is located in a cell of a base station or a core network corresponding to the NTN gateway. In some cases, for example, with the movement of satellites, the NTN gateway connected to the satellite may change, so that the feeder link of the satellite will change from the old NTN gateway to a new NTN gateway. If the service entities connected to the old NTN gateway and to the new NTN gateway are different, i.e., the serving entity will change. At this time, all or part of the UE connected with the base station of the old NTN gateway needs to be handed over to the base station of the new NTN gateway due to the change of the serving entity, which will involve a handover procedure between the UE and the network entity. In addition, in a dual connection scenario, if the changed serving entity is the Secondary Node (SN) of the UE, it will involve a reconfiguration procedure between the UE and the network entity (i.e., the Main Node connected to the UE reconfigures the secondary node of the UE to a new SN).

As the handover or reconfiguration procedure caused by the change of the serving entity mentioned above usually involves the handover or reconfiguration of a large amount of UEs, using the traditional handover or reconfiguration method is likely to cause a failure in completing the handover or reconfiguration procedure due to insufficient random access resources, or to cause too long time taken by most UE to complete the handover or reconfiguration due to the excessive amount of UE performing handover or reconfiguration. On the other hand, the large amount of UEs in need of handover or reconfiguration will cause huge signaling overhead.

In view of this, the method or device for changing a serving entity according to the embodiment of the present disclosure assists the procedure involved in the serving entity changing, such as the handover or reconfiguration procedure, by collecting relevant information in advance, and improves various aspects involved in the serving entity changing, such as the handover or reconfiguration procedure. A detailed description will be given below. Please note that although the following description mainly focuses on the handover or reconfiguration procedure involved in the serving entity changing, it should be understood that the present disclosure is not limited to this, but may also be applied to other procedures involved in the serving entity changing.

FIG. 3 illustrates an example flowchart of a method and a device for changing a serving entity according to an embodiment of the present disclosure. A detailed description of steps unrelated to the present disclosure is omitted here in the description of FIG. 3. The method comprises the following steps:

At step 300, collecting, by a first entity and/or a second entity, information related to changing a serving entity, such as but not limited to information related to handover or reconfiguration. The first entity or the second entity may collect their own information, or the first entity may collect the information of the second entity. For example, the first entity may be a base station, a CU or a core network node, the second entity may be a base station, a DU or a core network node, and the core network node may be an AMF. The information may be information such as random access configuration, TA-related information and/or antenna polarization mode, etc.

The information collection procedure is divided into the following cases:

In case 300A, if the first entity or the second entity collects information related to changing the serving entity individually, the information related to changing the serving entity may be obtained by the first entity or the second entity according to its own configuration, or may be obtained by the transfer of signaling messages. In the case of obtaining the information related to changing the serving entity through the transfer of signaling messages, the entity (the first entity or the second entity) is, for example, in split architecture of the CU and the DU, and the information is on the DU, so the DU in the entity (the first entity or the second entity) needs to send the information to the CU of the entity. In various implementations, the information may be requested by the CU sending a request to the DU, or by the DU spontaneously reporting to the CU. Both the CU and the DU belong to the first entity or the second entity.

If the information is requested by the CU sending a request, the sent request may include information such as a request for random access configuration, a request for TA-related information and/or a request for polarization mode, and the message transferring the request may be, for example, a GNB-CU configuration update message, a GNB-DU resource cooperation request message or a GNB-DU configuration request message, etc.

The DU can respond information related to changing the serving entity to the CU spontaneously or according to the content of a request, and the information may be information such as random access configuration, TA assistance information and/or polarization mode, etc., and the message transferring the information may be, for example, a GNB-CU configuration update acknowledgment message, a GNB-DU resource cooperation response message, a GNB-DU configuration response message, an F1 setup request message or a GNB-DU configuration update message, etc.

In case 300B, if the first entity collects information from the second entity, one possible case is that a first base station collects information from a second base station, and the information may be obtained by the transfer of signaling messages. The specific procedure may be, for example, sending, by the first entity, a request for information to the second entity, wherein the request may be a request for common configuration information of the second entity, and may be transferred by messages such as a message for requesting common configuration, an NG-RAN configuration update message, a satellite connection request message, a message indicating preparation for satellite connection, or a message indicating preparation for group handover, etc. The second entity receives the message and sends information response to the first entity, wherein the response may be common configuration information of the second entity, and the common configuration information may include multiple RB configuration lists. The response may be transferred by messages such as a message for responding common configuration, an NG-RAN configuration update acknowledgment message, a satellite connection response message, a message for acknowledging preparation for satellite connection, or a message for acknowledging preparation for group handover, etc.

At step 301, receiving, by the first entity, an indication to change the serving entity from the third entity, wherein the indication may be sent directly by the third entity to the first entity, or sent by the third entity to the first entity through the second entity, wherein the third entity may be a satellite, and the satellite may have the function of a base station or a DU. The purpose of the indication may be, for example, informing the first entity that all or part of the UE under the first entity need to change their service entities, so that the UE can access to specific cells under the second entity through, for example, handover or reconfiguration. The indication needs to carry a cell ID serving the UE under the first entity, a second entity ID and/or a specific cell ID to be serving the UE under the second entity.

The generation and sending of the indication may be divided into the following cases:

In case 301A, measurement configuration information is sent by the first entity to the third entity while maintaining the connection with the third entity. The measurement configuration information may include information such as a measurement object, a measurement event and/or reporting configuration, and may be transferred, for example, by an NG setup response message, an NG recovery response message and an AMF configuration update message sent by the core network to the base station, or be transferred, for example, by an F1 setup response message, a GNB-CU configuration update message, a GNB-DU resource cooperation request message, an F1 resume response message or a message for satellite measurement configuration, etc. sent by a CU to a DU.

After the measurement configuration is received by the third entity, if the configured measurement event meets the conditions, an indication of measurement results is sent by the third entity to the first entity, wherein the indication of measurement results may include a measurement object, measurement results and/or an indication of changing the serving entity. The measurement object may include a measurement target entity ID, and the indication of changing the serving entity may be transferred by messages such as a measurement report message, a message for link measurement report, or a link switch over indication message, etc. sent by the base station to the core network, or transferred by messages such as a measurement report message, a message for link measurement report, a link switch over indication message, or a message for indicating the state of the GNB-DU, etc. sent by the DU to the CU.

In case 301B, the entity (e.g., the second entity) that may be connected is measured by the third entity through the configured trajectory information of a satellite or a position information list of a pre-configured ground entity (e.g., an NTN gateway), and when certain conditions are met (e.g., the signal quality is good and/or the coverage angle reaches a certain threshold), a procedure of connection setup or connection resume is initiated by the third entity to the second entity, and during the procedure, the ID information of the first entity connected to the third entity and/or the ID information of a specific serving cell under the first entity is sent by the third entity to the second entity to indicate the changing of the serving entity. The information may be transferred by messages such as an NG setup request message and an NG resume request message sent by the base station to the core network, or transferred by messages such as an F1 setup request message and an F1 resume request message etc. sent by the DU to the CU. According to the received information, an indication to change the serving entity is sent by the second entity to the first entity.

At step 302, initiating to the second entity, by the first entity, a preparation procedure for changing the serving entity, such as a preparation procedure for handover or reconfiguration. The initiating of the preparation procedure may be realized via a request for, for example, handover preparation or UE context setup preparation. According to the different methods of realizing the procedure involved in changing the serving entity (the following takes handover or reconfiguration as the example of procedure involved in changing the serving entity), it can be divided into the following cases:

In case 302A, if the first entity decides that the UE does not use random access procedure to access the second entity when performing handover or reconfiguration (i.e., a kind of handover or reconfiguration without random access), then the first entity sends TA assistance information, frequency offset information, UE position information, power control information, TA assistance information request and/or serving cell coverage configuration to the second entity, and the sent information may be transferred by messages such as a satellite connection request message or a handover request message, etc.

After receiving the information, the second entity generates information such as uplink grant, TA offset, frequency offset compensation and transmission power control for the specific UE according to the information collected at the step 300 and other configured information (such as satellite trajectory, etc.).

The second entity sends uplink grant, TA offset, frequency offset compensation, transmission power control, TA assistance information and/or mapping cell information to the first entity, wherein the above-mentioned information may be transferred by messages such as a satellite connection response message or a handover request acknowledgment message, etc.

In case 302B, if the first entity decides to use the enhanced condition handover method when performing handover or reconfiguration, the first entity sends a random access configuration request or UE list information to the second entity, wherein the UE list includes the number of all the UE that needs handover and/or the position information of the UE that needs handover. The random access configuration request or the UE list information may be transferred by messages such as an Xn setup request message, an NG-RAN configuration update message, a satellite connection request message, and a message for requesting satellite handover, etc.

After the message is received, the second entity sends random access configuration information or new UE list information to the first entity according to the information collected at the step 300. In various implementations, the random access configuration information may include the number of preambles corresponding to different scenarios, and the new UE list includes handover conditions and handover configuration for each UE that requests/needs handover. In an implementation, the random access configuration information or the new UE list information may be transferred by messages such as an Xn setup response message, an NG-RAN configuration update acknowledgment message, a satellite connection response message, and a message for acknowledging the request for satellite handover, etc.

In case 302C, if the procedure of the changing serving entity uses the group handover method, the first entity sends a request related to group handover preparation to the second entity, and the request may include common information that is needed for handover and dedicated configuration information of all UE that needs handover. In one implementation, the request may be transferred by a message for requesting group handover, a message for requesting satellite handover or a message for requesting satellite connection, etc.

The second entity receives the request, generates a group handover policy according to the information collected at the step 300 and its own configuration, and generates handover common information and the dedicated configuration information of each UE according to the group handover policy, and sends the generated common information and dedicated configuration information of each UE to the first entity. The dedicated configuration includes the configuration index of the bearer of each UE. The second entity may, for example, generate dedicated handover commands for different UEs according to the configuration index in the common configuration information obtained at the step 300B. In an implementation, the generated common information and the dedicated configuration information of the UE may be transferred by messages such as a message for acknowledging the request for group handover, a message for acknowledging the request for satellite handover, or a satellite connection response message, etc.

At step 303, initiating to the UE, by the first entity, the changing of the serving entity.

If a random-access-less handover or reconfiguration method is used, the first entity sends information such as TA offset, frequency offset compensation, uplink grant and/or transmission power control etc. to the UE. The TA offset may be a TA value carrying with multiple time stamps, and the information may be transferred by, for example, RRC reconfiguration, wherein the TA offset may also be broadcast by a system information. After receiving the message, the UE sends handover complete or reconfiguration complete to the first entity at a specific time according to the TA offset and uplink grant, the handover complete or reconfiguration complete may carry the UE ID and the measured beam ID information of the second entity, and the handover complete or reconfiguration complete may be transferred by a RRC reconfiguration complete message. In this way, the UE can successfully access the target cell and complete uplink synchronization without a random access procedure. Meanwhile, the problems of insufficient random access resources, random access conflict or random access failure when a large amount of UEs needs to access the target cell synchronously are avoided.

If an enhanced condition handover method is used, different UEs in the cell will receive different handover conditions for accessing the target cell, and the handover conditions are well-configured according to the random access resources of the target cell and the number of users in need of handover. Therefore, even if a large amount of UEs need to initiate random access to a target base station, different UEs will initiate random access requests at different times according to different conditions, so random access conflicts or failures are unlikely to occur.

If group handover is used, the UE in need of handover in the cell can obtain the common information in the handover command by reading the system information, and then obtain the specific handover information for each UE through RRC reconfiguration, wherein the specific handover information for the UE contains different handover configurations such as handover conditions and dedicated random access configuration of each UE according to the overall handover requests and the resources of the target cell. After the UE accesses a new target cell (i.e., a cell under the second entity), the second entity may send a message related to group path switch to the core network, wherein the message carries common information of path switch and dedicated information of the UE, such as information of UE ID and bearers, etc. In this way, when a large amount of UEs in the cell need to be handed over to the same target base station, the problems such as insufficient random access resources and random access conflicts can be avoided or reduced. Meanwhile, since the common information of multiple UE is sent only once, the signaling overhead of the interface can also be saved.

The method and device for changing a serving entity according to an embodiment of the present disclosure have been described above in combination with FIG. 3. FIG. 3 illustrates the signaling procedure among core network nodes, base stations, CUs, DUs and other entities. Additionally or alternatively, each of the entities shown in FIG. 3 may be replaced by another entity or a combination of entities in the existing network or a future network that can realize the same or similar functions, and any signaling (or message) transferred between the entities illustrated in FIG. 3 may be replaced by another signaling (or message) in the existing network or a future network that can realize the same or similar functions.

With the method described in combination with FIG. 3, when the serving entity is changed in a network such as an NTN, and thus large-scale user handover or reconfiguration occurs, the problems such as insufficient random access resources and a large amount of signaling loads caused by simultaneous handovers or reconfigurations of a large amount of UEs can be solved through pre-obtained assistance information combined with various handover or reconfiguration methods (such as random-access-less handover or reconfiguration, enhanced condition handover and/or group handover, etc.). It can not only avoid the problems of handover or reconfiguration failure and long time delay caused by insufficient resources, but also reduce the signaling load on the interface, thus ensuring the user experience and saving the cost of operators.

Figure 4:
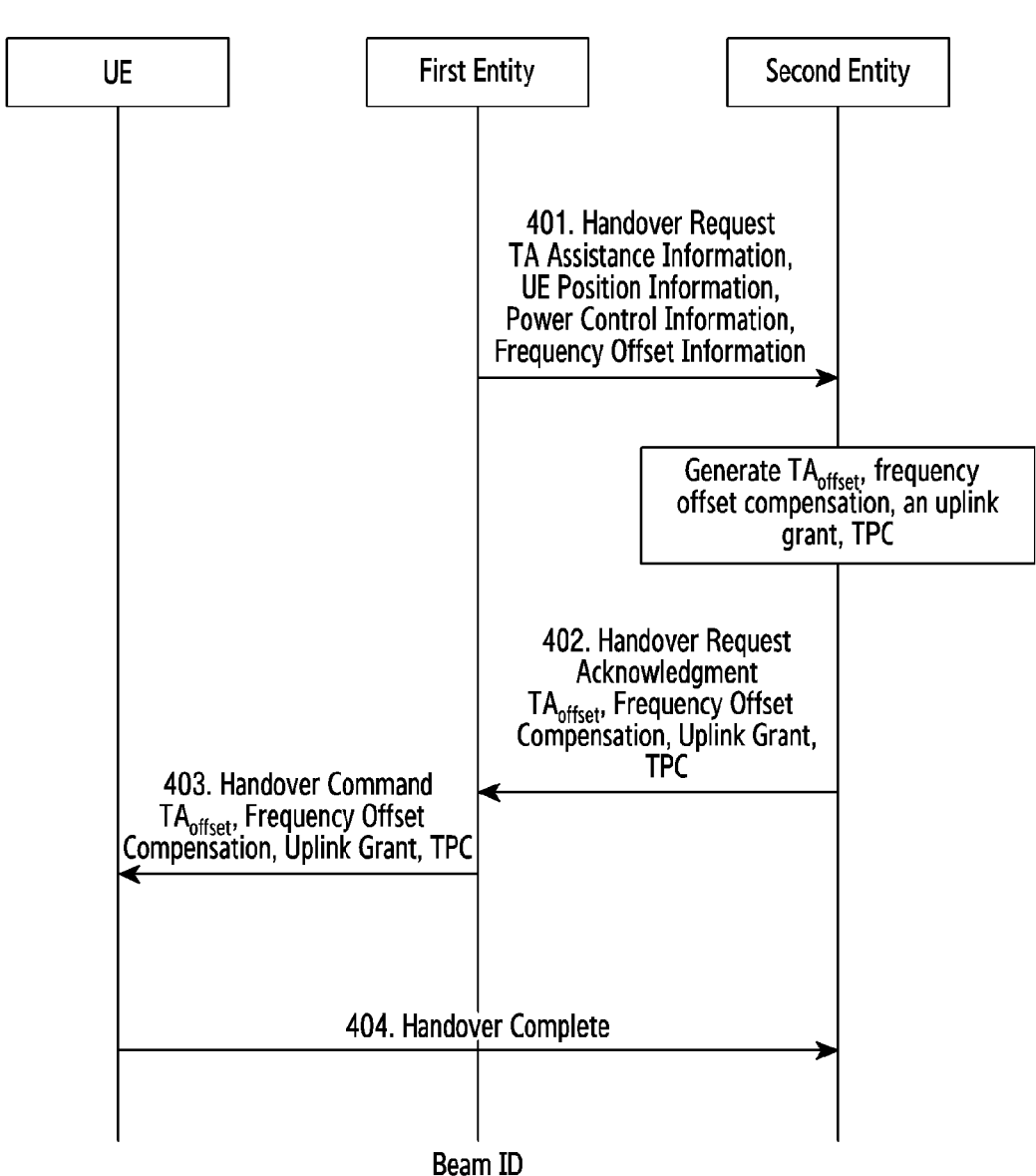
FIG. 4 illustrates an example of one aspect of a method and a device for changing a serving entity according to an embodiment of the present disclosure.

FIG. 4 illustrates an example of one aspect of a method and device for changing a serving entity according to an embodiment of the present disclosure. A detailed description of steps unrelated to the present disclosure is omitted in the description of FIG. 4. The method comprises the following steps:

At step 401, sending, by a first entity, a handover request to a second entity. In an implementation, the first entity and the second entity may be a base station, and the request may be a handover request for UE under a first base station to be handed over to a second base station triggered by feeder link switch over in an NTN, and the request may be transferred by, for example, a satellite connection request message or a handover request message. In an implementation, the handover request may include at least one of the following:

a UE ID, used to indicate a specific UE in the current network, and may be GUTI;

TA assistance information, assistance information which can be used to generate TA offset of the UE after handover, and may include at least one of the following:

feeder link delay, used to indicate the delay between the NTN gateway connected to the first entity and the satellite, and can be calculated from the known or configured trajectory of the satellite and the geographic position information of the NTN gateway connected to the first entity; and geographic position information of the NTN gateway connected to the first entity, used to calculate the transmission delay between the NTN gateway connected to the first entity and the satellite, and may be geographic coordinate information or the NTN gateway ID, and if it is ID information, the entity receiving the information can query the geographic coordinate information of the corresponding NTN gateway through the ID.

TA_S (time advance source), used to indicate the TA value between the current UE and a source entity (an entity before handover or reconfiguration, i.e., the first entity in the example of this embodiment), and the TA_S includes the impact of the delay of the service link and the feeder link; and time stamp, used to indicate the time corresponding to the TA assistance information, and may be, for example, a system frame number, a subframe number and/or a slot number, or absolute time, such as UTC (Universal Time Coordinated).

UE position information, which may include at least one of the following:

beam ID, used to indicate the beam currently used by the UE under the first entity, and the beam may be, for example, an SSB (Synchronous System Information Block) index or a CSI-RS (Channel State Indicator-Reference Signal) index;

geographic coordinates, used to indicate the current actual geographic position of the UE;

time stamp, used to indicate the time corresponding to the UE position information, and may be, for example, a system frame number, a subframe number and/or a slot number, or absolute time, such as UTC (Universal Time Coordinated).

power control information, used to assist the second entity to calculate transmission power control (TPC) information of the UE for accessing the target cell under the second entity, and may include at least one of the following:

PHR (Power Headroom Report), which indicates the latest power headroom report of the UE under the first entity, is used to infer the transmission power corresponding to the UE;

PSD_RX (Received Power Spectral Density) for indicating the received power spectral density of the first entity receiving the UE uplink signal, is used to indicate the power of the uplink signal received by the first entity;

time stamp, used to indicate the time corresponding to the power control information, such as the system frame number, the subframe number and/or slot number, or absolute time, such as UTC; and frequency offset information, which indicates the frequency offset compensation value used by the UE in the source serving cell under the first entity, is used to assist the second entity to calculate the frequency offset compensation value when the UE accesses the target cell under the second entity.

Upon receiving the message, the second entity can calculate the TA offset (TA_offset) of the UE for accessing the target cell under the second entity, according to the feeder link delay or the position information of the NTN gateway connected to the first entity, combined with the time stamp and the known information such as geographic position of the NTN gateway connected to the second entity. The TA offset refers to the time advance offset of the first uplink message sent when the UE accesses to the second entity, and the offset refers to the increase or decrease amount on the basis of the TA used by the UE under the first entity.

The second entity can calculate the required frequency offset compensation of the UE to access the target cell under the second entity according to the frequency offset compensation of the UE in the serving cell under the first entity, combined with the operation frequencies of the serving cell and the target cell before and after the handover.

The second entity can also allocate a specific uplink grant to the UE according to the time advance TA of the UE in the serving cell under the first entity and the calculated TA offset, or directly according to the information such as UE position information, etc. combined with the time stamp that provides information. The uplink grant refers to a scheduled time-frequency resource indication of a first uplink message when the UE access to the second entity, and may be forwarded to the UE by the first entity or notified the UE through scheduling information after the UE obtains downlink synchronization with the second entity.

The second entity can also calculate the TPC information of the UE for accessing the target cell under the second entity according to PHR, PSD_RX and/or time stamp information, combined with the condition of the feeder link between the second entity and the satellite, and the TPC information can be forwarded to the UE by the first entity or be notified to the UE through scheduling information after the UE obtains downlink synchronization with the second entity.

Since the service link connecting the UE and the satellite does not change during the feeder link switch over, the second entity can infer the best beam after the UE accesses the target cell under the second entity according to the beam ID indication of the source serving cell under the first entity, so as to better schedule the UE later.

At step 402, sending, by the second entity, a handover request acknowledgment to the first entity. In an implementation, if a satellite connection request message is received at the step 401, the handover request acknowledgment may be a satellite connection response message; if a handover request message is received at the step 401, the handover request acknowledgment may be a handover request acknowledgment message.

The handover request acknowledgment may carry at least one of the following:

a UE ID, which indicates an ID of the UE after handover to the target cell under the second entity, is used to identify specific UE in the target cell under the second entity, may be C-RNTI;

an uplink grant, used to schedule the first uplink message after the UE is handed over to the second entity;

TPC, used to indicate power adjustment amount corresponding to the uplink message sent when the UE accesses the second entity; and TA offset, used to indicate the time advance of the first uplink message sent after the handover of the UE to the second entity, and may be a positive value or a negative value. The specific sending time is an increase or decrease amount based on the original TA of the UE (the TA in the case of currently connected to the first entity);

frequency offset compensation, if the frequency offset compensation is calculated by the network, the compensation indicates the frequency offset compensation value of the first uplink message after the UE accesses the target cell under the second entity; and a frequency offset compensation indication, used to indicate that the frequency offset compensation after the handover of the UE can be calculated based on the compensation value of the source cell and the operating frequency of the target cell, if the frequency offset compensation is calculated by the UE.

At step 403, sending, by the first entity, a handover command to the UE, wherein the command may be transferred by a RRC reconfiguration message, and the handover command includes the contents that can be included in the handover request acknowledgment at the step 402.

At step 404, after receiving the handover command, sending, by the UE, handover complete to the second entity at the corresponding time and on the corresponding time frequency resources according to the uplink grant and TA offset, and the handover complete may be transferred by a RRC reconfiguration complete message. The handover complete can carry at least one of the following:

a UE ID, which indicates an ID of the UE after handover to the target cell under the second entity, is used to identify specific UE in the target cell under the second entity, and may be C-RNTI, and this is an optional item; and a beam ID, used to indicate the strongest beam of the target cell under the second entity measured by the UE, and may be, for example, an SSB beam ID.

With TA offset, frequency offset compensation, an uplink grant and/or TPC information, the UE can know with how much power, when, and on what frequency resources to send uplink signals to the target cell under the second entity, and in this way, the UE can successfully obtain uplink synchronization with the second entity. After receiving the uplink signal, the second entity knows which UE is successfully handed over or reconfigured according to the UE ID information provided by the UE, and knows which beam to be used to schedule the UE according to the beam ID obtained at the step 401 or step 404. In this way, a random-access-less handover procedure can be completed.

An example of one aspect of a method and a device for changing a serving entity has been described above in combination with FIG. 4. In FIG. 4, the signaling procedure between the UE, the base station and other entities is illustrated. Additionally or alternatively, each of the entities illustrated in FIG. 4 may be replaced by another entity or a combination of entities in the existing network or a future network that can realize the same or similar functions, and any signaling (or message) transferred between the entities illustrated in FIG. 4 may be replaced by another signaling (or message) in the existing network or a future network that can realize the same or similar functions.

With the method described in combination with FIG. 4, a random-access-less handover procedure can be realized. Through obtaining the relevant TA assistance information, frequency offset information, position information and/or power control information in the handover preparation procedure, the uplink synchronization information, scheduling information and/or power control information of the UE for accessing the target network can be achieved without random access, therefore the UE can successfully access the target network even without random access. According to the method and the device for changing the serving entity in the embodiment of the disclosure, in a case such as feeder link switch over in the NTN and when large-scale users need to be handed over simultaneously, handover failure and service interruption caused by insufficient random access resources can be avoided, the network KPI (Key Performance Index) can be improved, thus ensuring user experience of the service.

Figure 5:
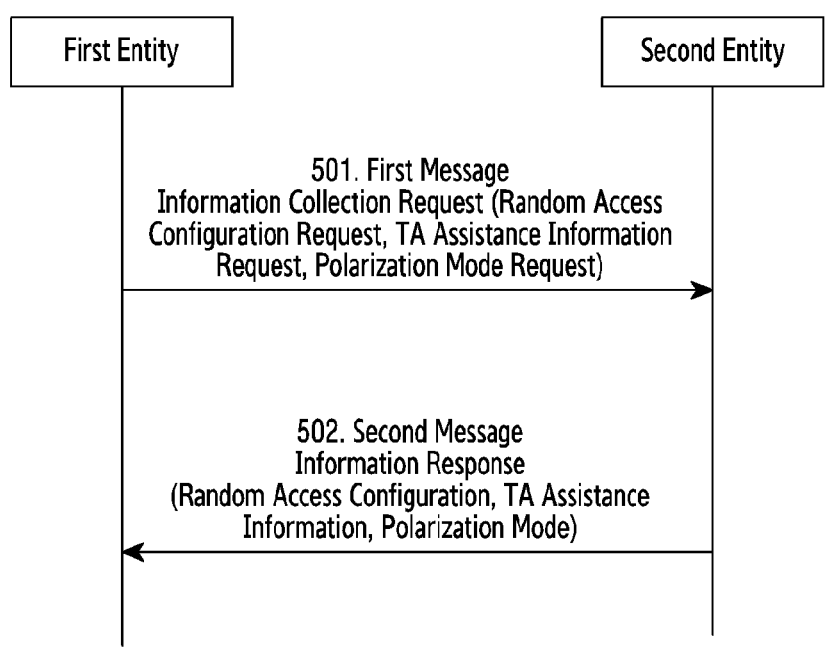
FIG. 5 illustrates an example of another aspect of a method and a device for changing a serving entity according to an embodiment of the present disclosure.

FIG. 5 illustrates an example of another aspect of a method and a device for changing a serving entity according to an embodiment of the present disclosure. A detailed description of steps unrelated to the present disclosure is omitted in the description of FIG. 5. The method comprises the following steps:

At step 501, sending, by a first entity, a first message to a second entity. In an implementation, the first entity may be a CU, the second entity may be a DU, and the first message may be a GNB-CU configuration update message, a GNB-DU resource cooperation request message or a GNB-DU configuration request message, etc. sent by the CU to the DU. The first message may carry at least one of the following:

a cell ID, used to indicate a specific cell under the second entity, and may be CGI, ECGI, PCI, etc.;

a random access configuration request, used to indicate a request for random access configuration of a specific cell under the second entity;

a TA assistance information request, used to indicate a request for TA assistance information of a specific cell under the second entity; and a polarization mode request, used to indicate a request for the polarization mode of a specific cell under the second entity.

The second entity receives the message.

At step 502, sending, by the second entity, a second message to the first entity, and the second message may be initiated due to the request at the step 501 or be initiated spontaneously by the second entity.

If it is sent due to the request at the step 501, there are several cases as follows:

Case 1: if the second entity receives a GNB-CU configuration update message at the step 501, then the second message is a GNB-CU configuration update acknowledgment message;

Case 2: if the second entity receives a GNB-DU resource cooperation request message at the step 501, then the second message is a GNB-DU resource cooperation response message; and Case 3: if the second entity receives a GNB-DU configuration request message at the step 501, then the second message is a GNB-DU configuration response message.

If sending a second message to the first entity is spontaneously initiated by the second entity according to its own configuration, then the second message may be, for example, an F1 setup request message or a GNB-DU configuration update message sent by the DU to the CU.

The second message may include at least one of the following:

a cell list, used to indicate one or more cells under the second entity, and the information of each cell in the cell list may include at least one of the following:

cell ID, used to indicate a specific cell under the second entity, and may be, for example, CGI, ECGI, PCI, etc.;

random access configuration, which refers to the configuration information of random access in the cell, may include, for example, the configuration of random access preamble and the configuration of random access channel; and TA assistance information, used to indicate the time advance TA F corresponding to the feeder link part between the satellite and the NTN gateway corresponding to the cell, wherein the time advance of the feeder link part is the same for all UE under the cell, and may specifically include at least one of the following:

a feeder link delay, used to indicate the delay between the second entity and the satellite, and can be calculated from the known or pre-configured satellite trajectory and the geographic position information of the NTN gateway connected to the second entity. The time delay may include a corresponding time stamp to indicate the time delay corresponding to different times;

geographic position information of the NTN gateway connected to the second entity, used to calculate the feeder link delay between the second entity and the satellite, and may be geographic coordinate information or an NTN gateway ID. If it is ID information, the entity that receives information can query the geographic coordinate information of the corresponding NTN gateway through the ID.

A polarization mode, used to indicate the antenna polarization mode used by the cell, and may be left-handed circular polarization, right-handed circular polarization, horizontal polarization or vertical polarization, etc.

The first entity receives the message.

After obtaining the random access configuration information, the first entity may use the information itself or forward the information to other entities according to the request, and the other entities may be base stations. When large-scale UE needs to be handed over to the second entity simultaneously or in a short time, the first entity or other entities well defines a handover policy according to the obtained random access configuration, and through configuring different handover conditions (such as handover time, etc.), the UE performs handover under different conditions, thus avoiding the shortage of random access resources and random access conflicts.

After obtaining the TA assistance information, the first entity may use the information itself or forward the information to other entities, which may be base stations. When the feeder link switch over occurs and random-access-less handover is needed, the first entity or other entities can generate the TA offset of the UE for handover to the target cell by using TA assistance information, and broadcast the TA offset through system information, so that the UE that needs feeder link switch over can obtain accurate time advance.

After obtaining the polarization mode information, the first entity can forward the information to other entities, which may be base stations, so that the entities can adjust parameters according to the polarization mode of neighboring cells to avoid interference. The information may also be broadcast to all the UE in the cell through system information, so that the UE can adjust the corresponding polarization receiving mode.

Another aspect of the method and device for changing the serving entity according to an embodiment of the present disclosure has been described above in combination with FIG. 5. In FIG. 5, a signaling procedure among entities such as the DU and the CU of a base station in split architecture of the CU and the DU is illustrated. Additionally or alternatively, each of the entities illustrated in FIG. 5 may be replaced by another entity or a combination of entities in the existing network or a future network that can realize the same or similar functions, and any signaling (or message) transferred between the entities illustrated in FIG. 5 may be replaced by another signaling (or message) in the existing network or a future network that can realize the same or similar functions.

With the method described in combination with FIG. 5, relevant assistance information can be well prepared before changing the serving entity, for example, before handover or reconfiguration occurs, and enhanced condition handover and/or random-access-less handover or reconfiguration can be realized through assistance information, thus avoiding handover or reconfiguration failure and service interruption caused by insufficient random access resources when handover or reconfiguration of large-scale UE occurs simultaneously in a scenario such as feeder link switch over, and also avoiding interference among neighboring areas. In this way, the UE can choose to use a better way to receive signals after accessing a new cell, thus ensuring user experience of the UE.

Figure 6:
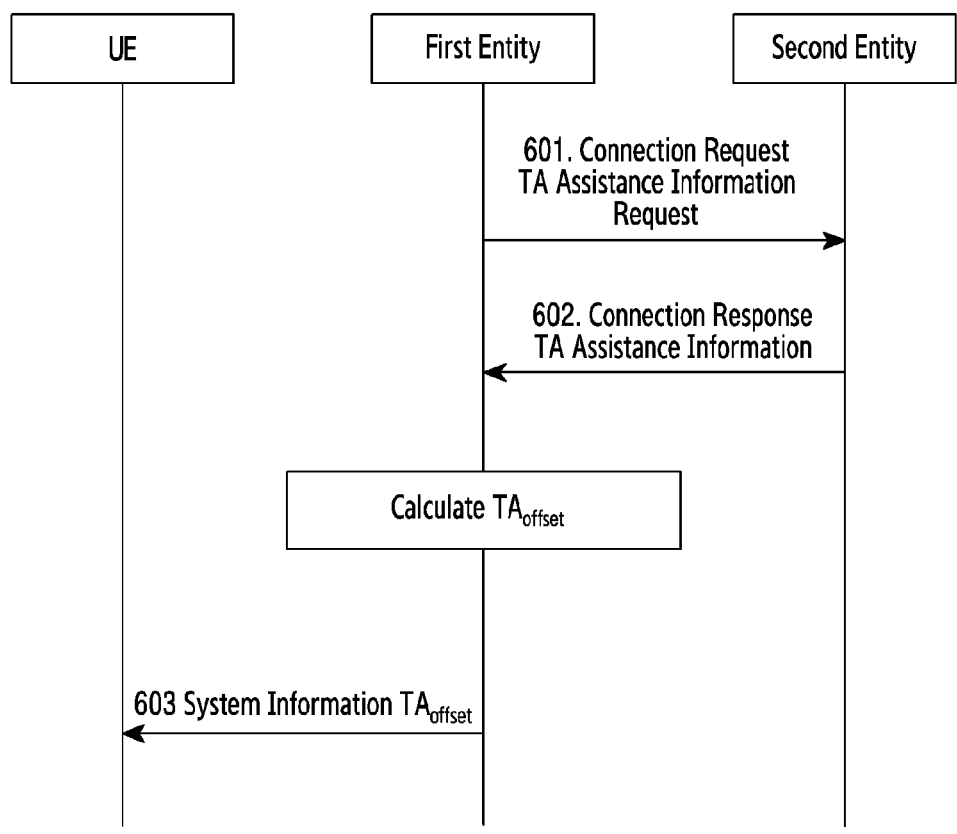
FIG. 6 illustrates an example of yet another aspect of a method and a device for changing a serving entity according to an embodiment of the present disclosure.

FIG. 6 illustrates an example of yet another aspect of a method and a device for changing a serving entity according to an embodiment of the present disclosure. A detailed description of steps unrelated to the present disclosure is omitted in the description of FIG. 6. The method comprises the following steps:

At step 601, sending, by a first entity, a request message to a second entity. In an implementation, the first entity and the second entity may be base stations, and the request message is triggered because a satellite connected to the first entity will perform a feeder link switch over procedure from the first entity to the second entity. For example, the request message may be transferred by a satellite connection request message or a message for requesting satellite handover.

The request message may include at least one of the following:
a serving cell list, used to indicate all cells serving the UE through satellites under the first entity, wherein each item in the serving cell list may include at least one of the following:

serving cell ID, used to indicate a specific cell serving the UE through satellites under the first entity;
serving cell coverage configuration information for indicating an antenna port or antenna configuration used by the specific cell, is used to infer the coverage area of the cell, so that the second entity can find or configure a cell with the same coverage area as the specific cell;
a TA assistance information request, used to indicate a request for TA assistance information of a specific cell under the second entity with the same or similar coverage area as the specific cell under the first entity.

The second entity receives the request message. If the second entity is in split architecture of the CU and the DU, the information requested by the first entity can be obtained through, for example, the step 501 to the step 502.

At step 602, sending, by the second entity, response to the first entity. In an implementation, the response may be transferred by a satellite connection response message or a message for acknowledging the request for satellite handover.

The response may include at least one of the following:
a serving cell list, used to indicate all cells serving the UE through satellites under the second entity, wherein each item in the serving cell list may include at least one of the following:
serving cell ID, used to indicate a specific cell serving the UE through satellites under the second entity;
mapping cell ID, used to indicate a specific cell under the first entity with the same or similar coverage area as the above specific cell under the second entity; and
TA assistance information, used to indicate the feeder link delay of the specific serving cell (i.e., the cell indicated by the serving cell ID), wherein the delay of the feeder link part is the same for the UEs under the cell, and may specifically include at least one of the following:
a feeder link delay, used to indicate the delay between the second entity and the satellite, and can be calculated from the trajectory of the satellite and the geographic position information of the NTN gateway connected to the second entity. The feeder link delay may include a corresponding time stamp to indicate the corresponding delay at different times; and
geographic position information of the NTN gateway connected to the second entity, used to calculate the feeder link delay between the second entity and the satellite, and may be geographic coordinate information or an NTN gateway ID. If it is ID information, the entity that receives information can query the geographic coordinate information of the corresponding NTN gateway through the ID.

The first entity receives the information.

The first entity configures the measurement information of the corresponding cell under the second entity (i.e., the target cell, for example, identified by the received serving cell ID) for the UE under the cell identified by the mapping cell ID according to the received mapping cell ID, or directly prepares for handover to the corresponding cell under the second entity.

The first entity calculates common TA offset required for handover to the specific cell (i. e., the target cell) under the second entity according to the received TA assistance information of the target cell under the second entity in combination with information on NTN gateway connected to the first entity and satellite trajectory information, wherein the common TA offset is the same for all the UE under the specific cell under the second entity, and may include at least one of the following:

a list of TA offset and time stamp, used to indicate the corresponding time advance offset when the first uplink message is sent as the UE is handed over to the target cell under the second entity, wherein the offset refers to the increase or decrease amount based on the existing time advance for the UE, and the list includes one or more TA lists and time stamps;

initial TA offset, used to indicate the time advance offset of the first uplink message sent when the UE is handed over to the target cell under the second entity as the UE executes handover immediately upon receiving the handover command; and a time factor, used to calculate the TA value corresponding to a specific time. If the TA offset changes with time due to the mobility of satellites, then at a specific time t, the corresponding TA offset=initial TA offset+(t−t0)*time factor, and t0 is the time corresponding to the initial TA offset.

At step 603, the first entity broadcasts the corresponding TA offset and time stamp information to the cell that needs link switch over, and the information is transferred by a system information.

The UE in the cell receives and reads the system information.

The UE can obtain the TA offset for accessing the target cell under the second entity by querying the time stamp or according to the time factor, according to the time when receiving the indication for changing the serving entity (such as handover/reconfiguration), and thus obtain the uplink synchronization with the second entity. In this way, when a large amount of UEs in the cell need handover or reconfiguration to the same target cell simultaneously, the signaling overhead of the air interface can be saved.

An example of yet another aspect of a method and a device for changing a serving entity according to an embodiment of the present disclosure has been described above in combination with FIG. 6. FIG. 6 illustrates the signaling procedure between entities such as base stations. However, additionally or alternatively, each of the entities illustrated in FIG. 6 may be replaced by another entity or a combination of entities in the existing network or a future network that can realize the same or similar functions, and any signaling (or message) transferred between the entities illustrated in FIG. 6 may be replaced by another signaling (or message) in the existing network or a future network that can realize the same or similar functions.

With the method described in combination with FIG. 6, when, for example, the serving entity changes due to link switch over, the common information for accessing a new entity can be broadcast to all the UE through the system information, thus avoiding handover failure and service interruption caused by insufficient random access resources when large-scale UE handover occurs under feeder link switch over, and saving signaling overhead, so as to ensure the user experience of the UE and reduce operation costs.

Figure 7:
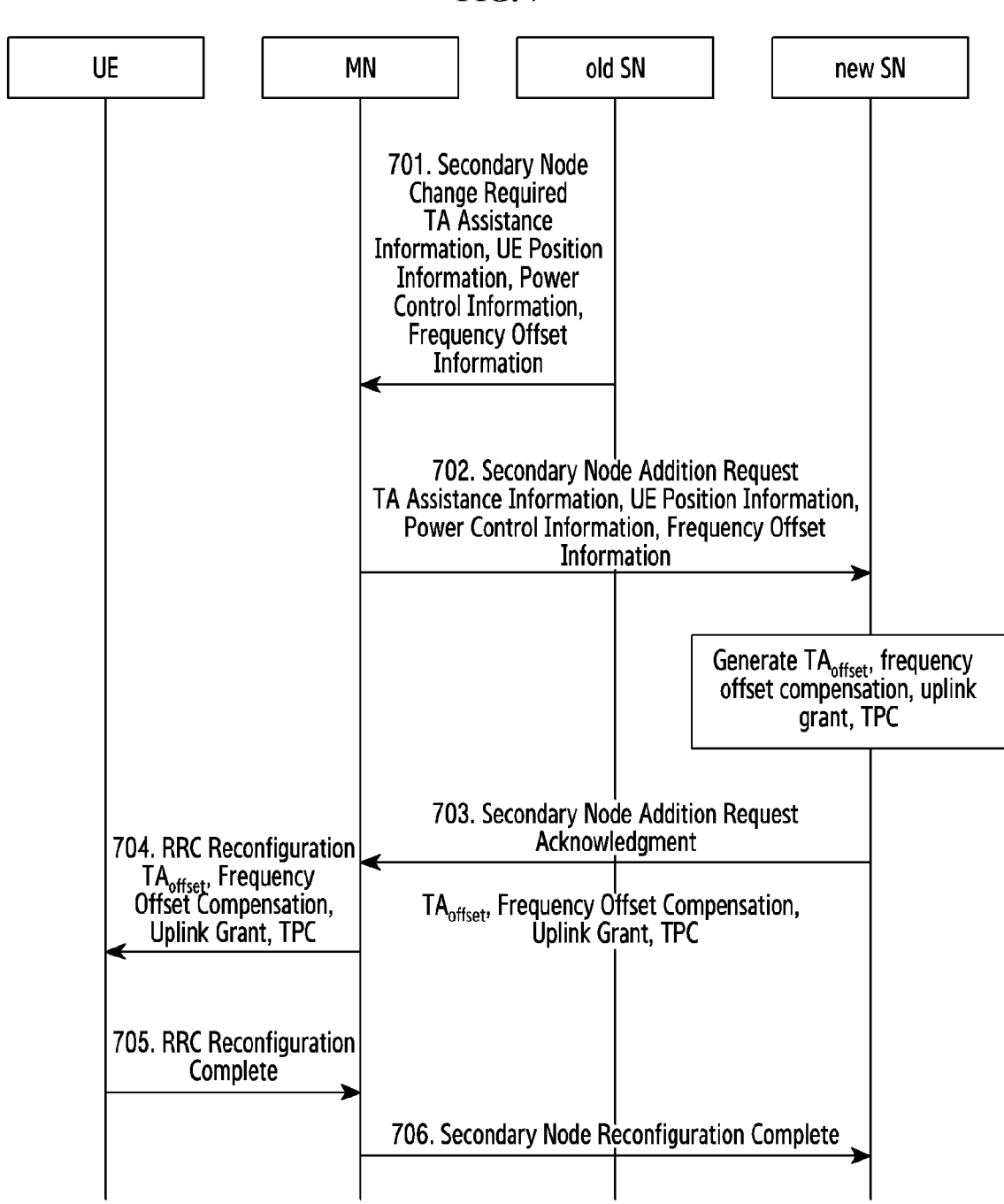
FIG. 7 illustrates an example of yet another aspect of a method and a device for changing a serving entity according to an embodiment of the present disclosure.

FIG. 7 illustrates an example of yet another aspect of a method and a device for changing a serving entity according to an embodiment of the present disclosure. A detailed description of steps unrelated to the present disclosure is omitted in the description of FIG. 7. The method comprises the steps of:

At step 701, the old SN (Secondary Node) sends a secondary node change required message to the MN (Main Node), wherein the MN is the radio access node responsible for the control plane connection between the UE and the core network in MR-DC (multi-RAT Dual Connectivity). For example, the MN may be a base station, but is not limited to this. The SN is a radio access node in the MR-DC that has no control plane connection with the core network and provides additional user plane connection for the UE. For example, the SN may be a base station, but is not limited to this. The message may be triggered, for example, by the case where the satellite connected to the old SN changes the serving entity from the old SN to the new SN, so that the feeder link switch over will occur, which causes the secondary node of the UE using the old SN as the secondary node to change, so it is necessary to perform the reconfiguration procedure to change the secondary node serving the UE. The secondary node change required message may include at least one of the following:

a UE ID, used to indicate the specific UE in the current network, and may be, for example, GUTI;

TA assistance information, used to indicate assistance information for generating TA offset for the UE after handover, and may include at least one of the following:

feeder link delay, used to indicate the delay between the NTN gateway connected to the old SN and the satellite, and can be calculated from the satellite trajectory and the geographic position information of the NTN gateway;

geographic position information of the NTN gateway, used to calculate the transmission delay between the NTN gateway and the satellite, and may be geographic coordinate information or an NTN gateway ID. If it is ID information, the entity that receives information can query the geographic coordinate information of the corresponding NTN gateway through the ID;

TA_S (time advance_source), used to indicate a TA value between the current UE and the NTN gateway connected to the old SN, and TA_S includes the impact of the delay of the service link and feeder link;

time stamp, used to indicate the time corresponding to the TA assistance information, and may be, for example, a system frame number, a subframe number and/or a slot number, or absolute time, such as UTC.

UE position information, which may include at least one of the following:

beam ID, used to indicate the beam currently used by the UE in the serving cell under the old SN, and may be, for example, an SSB index or a CSI-RS index;

geographic coordinates, used to indicate the current actual geographic position of the UE; and time stamp, used to indicate the time corresponding to the UE position information, and may be, for example, a system frame number, a subframe number and/or a slot number, or absolute time, such as.

power control information, used to assist the new SN to calculate TPC information of the UE for accessing the target cell of the new SN, and may include at least one of the following:

PHR, which indicates the latest power headroom report of the UE under the old SN, is used to infer the corresponding transmission power of the UE;

PSD_RX, which indicates the received power spectral density of the old SN for receiving the UE uplink signals, is used to indicate the power of the old SN for receiving uplink signals; and time stamp, used to indicate the time corresponding to the power control information, and may be, for example, a system frame number, a subframe number and/or a slot number, or absolute time, such as UTC.

frequency offset information, used to indicate the frequency offset compensation value used by the UE in the source serving cell under the old SN, and it is used to assist the new SN to calculate the frequency offset compensation value when the UE accesses the target cell under the new SN.

At step 702, the MN sends a secondary node addition request message to the new SN, and the information carried in the message is consistent with the information in the step 701.

After receiving the message, the new SN can calculate the TA offset for the UE accessing the target cell of the new SN according to the feeder link delay or the position information of the NTN gateway connected to the old SN, combined with the time stamp and the known geographic position information of the NTN gateway connected to the new SN. The TA offset refers to the time advance offset of the first uplink message sent when the UE accesses the new SN, and the offset refers to the increase or decrease amount based on the TA used under the old SN for the UE.

The new SN can calculate the frequency offset compensation required for the UE to access the target cell under the new SN according to the frequency offset compensation of the UE in the serving cell under the old SN, combined with the operation frequencies of the serving cell and the target cell before and after the handover.

The new SN can also allocate a specific uplink grant to the UE according to the time advance of the UE in the serving cell under the old SN and the calculated TA offset, or directly according to the information such as the position information of the UE, combined with the time stamp that provides the information. The uplink grant refers to the time-frequency resource indication of the first uplink message that schedules the UE to access the new SN, and it may be forwarded to the UE by the MN, or may be notified to the UE through scheduling information after the UE obtains downlink synchronization with the new SN.

The second entity can also calculate the TPC information for the UE accessing the target cell under the second entity according to PHR, PSD_RX and/or time stamp information, combined with the condition of the direct feeder link between the second entity and the satellite, wherein the TPC information may be forwarded to the UE by the first entity or notified to the UE through scheduling information after the UE obtains the downlink synchronization with the second entity.

At step 703, the new SN sends an acknowledgment for secondary node addition request message to the MN, wherein the message may carry at least one of the following:

a UE ID, which refers to the ID of the UE reconfigured to the target cell under the new SN, and is used to identify specific UE in the cell, and it may be, for example, C-RNTI;

an uplink grant, used for scheduling the first uplink message after the UE is handed over to the new SN;

TPC, used to indicate the power adjustment amount corresponding to the uplink message sent when the UE accesses the target cell under the new SN;

TA offset, used to indicate the time of the first uplink message sent after the handover of the UE to the target cell under the new SN, and may be a positive value or a negative value, and the specific sending time is the increase or decrease amount based on the original TA of the UE (the current TA under the connection to the old SN);

frequency offset compensation, if the frequency offset compensation is calculated by the network, the compensation indicates the frequency offset compensation value for the first uplink message after the UE accesses the target cell under the new SN; and a frequency offset compensation indication, which indicates that the frequency offset compensation after handover of the UE can be calculated based on the compensation value of the source cell and the operation frequency of the target cell if the frequency offset compensation is calculated by the UE.

At step 704, the MN sends an RRC reconfiguration message to the UE, wherein the message carries the relevant configuration for accessing the new SN, and the message may carry at least one of the following:

a UE ID, which indicates the ID of the UE reconfigured to the target cell under the new SN, is used to identify specific UE in the target cell, and it may be, for example, C-RNTI, and it is optional information;

a beam ID, used to indicate the strongest beam of the target cell under the new SN measured by the UE, and may be, for example, an SSB index.

The UE receives the message and the configuration.

With TA offset, frequency offset compensation, an uplink grant and/or TPC information, the UE can know at what power, when, and on what frequency resources to send uplink signals to the target cells under the new SN, and in this way, the UE can successfully obtain uplink synchronization with the new SN. After receiving the uplink signals, the new SN knows which UE is successfully reconfigured according to the UE ID information provided by the UE, and which beam to use to schedule the UE according to the beam ID obtained at the step 702 or the step 704. In this way, a secondary node addition procedure without random access is completed.

At step 705, the UE sends an RRC reconfiguration complete message to the MN to indicate the complete of the reconfiguration.

At step 706, the MN sends the reconfiguration complete of the secondary node to the new SN to indicate the complete of the uplink synchronization between the UE and the new SN.

In this way, the UE under the feeder link switch over can complete uplink synchronization with the new SN without a random access procedure. If the UE has uplink data to send on the new SN, it can send uplink data on the resource indicated by the uplink grant according to the uplink grant obtained at the step 704, and the time for sending the uplink data needs to refer to TA offset.

An example of yet another aspect of a method and a device for changing a serving entity according to an embodiment of the present disclosure has been described above in combination with FIG. 7. In FIG. 7, a signaling procedure between an MN, an SN and other entities is illustrated. Additionally or alternatively, each entity illustrated in FIG. 7 may be replaced by another entity or a combination of multiple entities in the existing network or a future network that can realize the same or similar functions, and any signaling (or message) transferred between the entities illustrated in FIG. 7 may be replaced by another signaling (or message) in the existing network or a future network that can realize the same or similar functions.

With the method described in combination with FIG. 7, an uplink synchronization procedure without random access is realized in a multi-connection scenario. Through obtaining the relevant position information and assistance information during the changing and creating of the secondary node, the UE can obtain the uplink synchronization information and scheduling information for accessing the target network, so that the UE can successfully access the target network even without a random access procedure. According to the method disclosed by the embodiment of the disclosure, in a case such as the feeder link switch over in the NTN, and when large-scale users need to change secondary nodes simultaneously, the problems of a failure to access the secondary nodes or too long time for accessing due to insufficient random access resources can be avoided, so that the network KPI (Key Performance Index) can be improved and good user experience of the service can be guaranteed.

Figure 8:
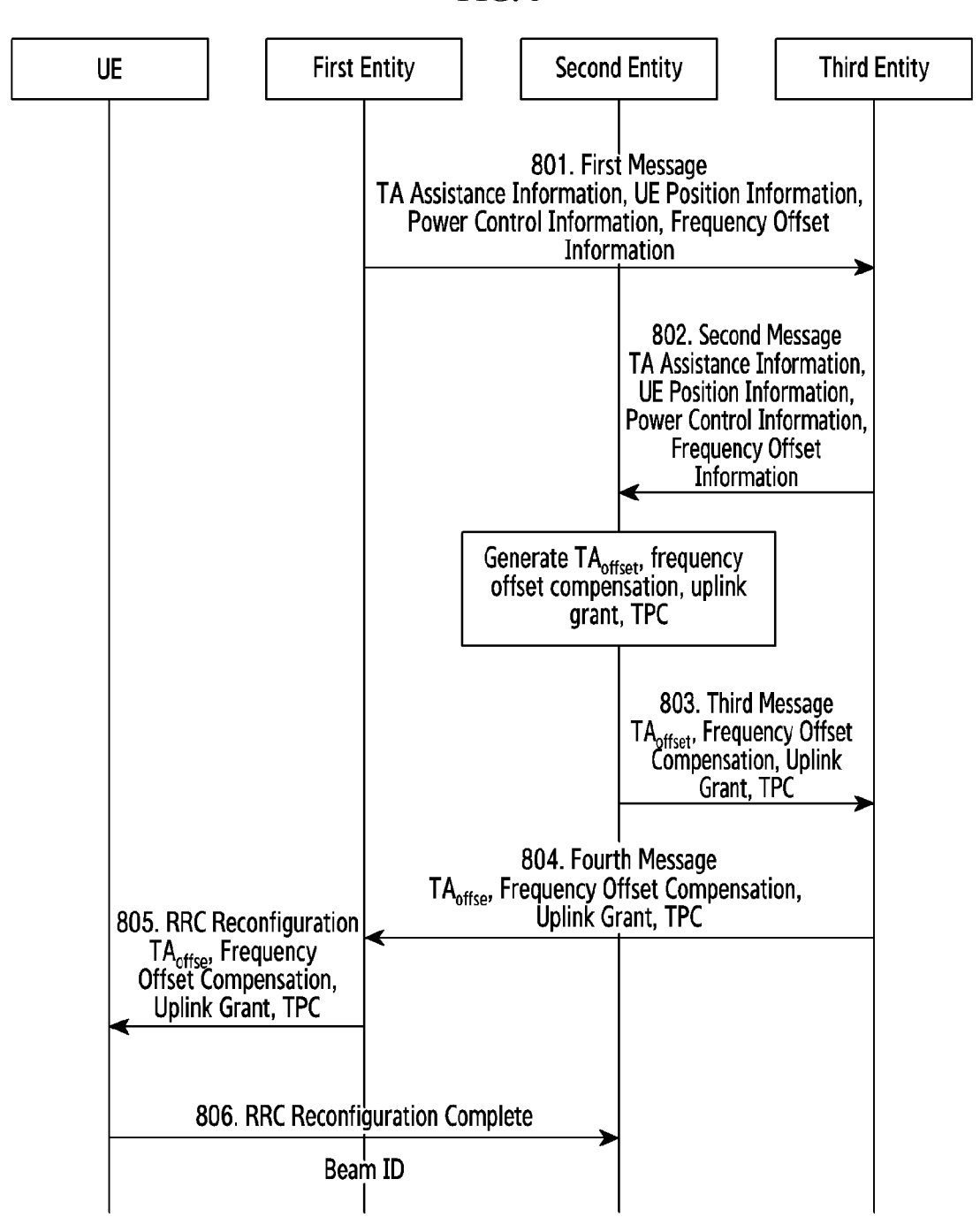
FIG. 8 illustrates an example of yet another aspect of a method and a device for changing a serving entity according to an embodiment of the present disclosure.

FIG. 8 illustrates an example of yet another aspect of a method and a device for changing a serving entity according to an embodiment of the present disclosure. A detailed description of steps unrelated to the present disclosure is omitted in the description of FIG. 8. The method comprises the following steps:

At step 801, a first entity sends a first message to a third entity. In various implementations, the first entity may be a base station or a DU, and the third entity may be an AMF or a CU, i.e., the first message may be a message sent by the base station to the AMF or a message sent by the DU to the CU. For example, the first message may be a handover required message sent by the base station to the AMF, or a UE context modification required message and an uplink RRC message transfer message sent by the DU to the CU, or other messages. The trigger event of the first message may be that the third entity (e.g., a satellite) connected to the first entity will perform the feeder link switch over from the first entity to the second entity, i.e., the UE covered by the third entity (e.g., a satellite) needs to be handed over or reconfigured from the first entity to the second entity.

The first message may include TA assistance information, frequency offset information, UE position information and/or power control information, and the specific contents are consistent with that described at the step 401.

A third entity receives the message.

At step 802, the third entity sends a second message to the second entity. In various implementations, the second entity may be a base station or a DU, i.e., the message may be a message sent by the AMF to the base station or a message sent by the CU to the DU. The message may be a handover request message sent by the AMF to the base station or a UE context setup request message sent by the CU to the DU.

The content included in the message is as described at the step 801.

After receiving the message, the second entity can calculate the TA offset for the UE accessing the target cell under the second entity according to the feeder link delay or position information of the NTN gateway connected to the first entity, combined with the time stamp and the known geographical position information of the NTN gateway connected to the second entity. The TA offset refers to the time advance offset for the first uplink message sent when the UE accesses the second entity, and the offset refers to the increase or decrease amount based on the TA used by the UE under the first entity.

The second entity can calculate the required frequency offset compensation for the UE to access the target cell under the second entity according to the frequency offset compensation of the UE in the serving cell under the first entity, combined with the operation frequencies of the serving cell and the target cell before and after the handover.

The second entity may also allocate a specific uplink grant to the UE according to the time advance TA and the calculated TA offset of the UE in the serving cell under the first entity, or directly according to the information such as the position information of the UE, combined with the time stamp that provides the information. The uplink grant refers to the time-frequency resource indication of the first uplink message that schedules the UE to access the second entity, and may be forwarded to the UE by the first entity or be notified to the UE through scheduling information after the UE obtains downlink synchronization with the second entity.

The second entity can also calculate the TPC information for the UE accessing the target cell under the second entity according to PHR, PSD_RX and/or time stamp information, combined with the condition of the feeder link between the second entity and the satellite, wherein the TPC information may be forwarded to the UE by the first entity or notified to the UE through scheduling information after the UE obtains the downlink synchronization with the second entity.

Since the service link connecting the UE and the satellite does not change during the feeder link switch over, the second entity can infer the best beam after the UE accesses the cell under the second entity according to the received beam ID indication under the first entity, so as to better schedule the UE later.

At step 803, the second entity sends a third message to the third entity. In various implementations, the third message may be a message sent by the base station to the AMF or a message sent by the DU to the CU. The third message may be a handover request acknowledgment message sent by the base station to the AMF or a UE context setup response message sent by the DU to the CU.

The third message may carry a UE ID, an uplink grant, TA offset, frequency offset compensation and/or TPC information, the particular content is as detailed at the step 402.

A third entity receives the message.

At step 804, the third entity sends a fourth message to the first entity. In various implementations, the fourth message may be a message sent by the AMF to the base station or a message sent by the CU to the DU. The fourth message may be a handover request acknowledgment message sent by the AMF to the base station, or a UE context modification request message sent by the CU to the DU, and the message includes a container for RRC reconfiguration, and the container contains information such as a UE ID, a UE ID, an uplink grant, TA_offset and/or TPC information and the like obtained at the step 803.

The first entity receives the fourth message.

At step 805, the first entity sends an RRC reconfiguration message to the UE, wherein the message may include information such as a UE ID, an uplink grant, TA offset, frequency offset compensation and/or TPC information, etc., as detailed at the step 803.

At step 806, after the RRC reconfiguration message is received by the UE, the UE sends an RRC reconfiguration complete message to the second entity at the time corresponding to the TA offset and the time-frequency resources according to the uplink grant and TA offset. The message may carry a UE ID and/or a beam ID, as detailed at the step 404.

The UE can successfully obtain uplink synchronization with the third entity through TA offset, the uplink grant and the TPC command. After receiving the RRC reconfiguration complete message, the third entity knows which UE is successfully handed over according to the UE ID information provided by the UE, and knows how to better use the beam to schedule the UE according to the beam ID obtained at the step 801 or the step 806. In this way, a random-access-less handover or reconfiguration procedure can be completed.

One aspect of a method and a device for changing a serving entity according to an embodiment of the present disclosure has been described above in combination with FIG. 8. In FIG. 8, the signaling procedure between the AMF, the base station, the CU, the DU and other entities is illustrated. Additionally or alternatively, each of the entities illustrated in FIG. 8 may be replaced by another entity or a combination of entities in the existing network or a future network that can realize the same or similar functions, and any signaling (or message) transferred between the entities illustrated in FIG. 8 may be replaced by another signaling (or message) in the existing network or a future network that can realize the same or similar functions.

With the method described in combination with FIG. 8, a random-access-less handover or reconfiguration procedure can be realized. The uplink synchronization information and scheduling information for the UE accessing the target network can be obtained in advance through obtaining relevant position information and assistance information in the procedure of handover preparation or context establishment, so that the UE can successfully access the new cell even without a random access procedure. According to the method of the embodiment of the disclosure, in a case such as the feeder link switch over due to a serving entity change in the NTN, and when large-scale users need to hand over or reconfigure simultaneously, handover or reconfiguration failure and service interruption caused by insufficient random access resources can be avoided, and thus the network KPI can be improved, and good user experience of the service can be guaranteed.

Figure 9:
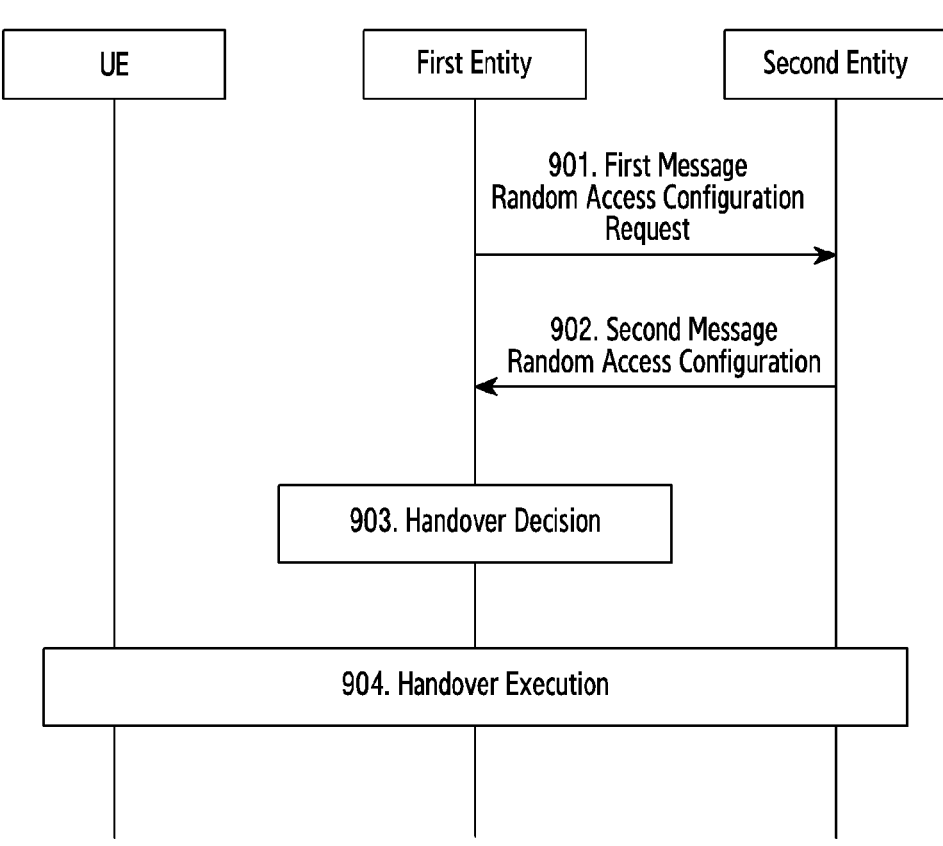
FIG. 9 illustrates an example of yet another aspect of a method and a device for changing a serving entity according to an embodiment of the present disclosure.

FIG. 9 illustrates an example of yet another aspect of a method and a device for changing a serving entity according to an embodiment of the present disclosure. A detailed description of steps unrelated to the present disclosure is omitted in the description of FIG. 9. The method comprises the following steps:

At step 901, a first entity sends a first message to a second entity. In various implementations, the first entity and the second entity may be base stations, and the first message may be an Xn setup request message, an NG-RAN configuration update message, a satellite connection request message, a message for requesting satellite handover, etc. sent by the first base station to the second base station.

The first message may include the following information:

a random access configuration request, used to indicate a request for random access configuration of a specific cell under the second entity.

The second entity receives the first message and collects relevant information according to the request. In an implementation, if the second entity is in split architecture of the CU and the DU, the required information can be obtained through the step 501 to the step 502.

At step 902, the second entity responds a second message to the first entity. In various implementations, the second message may be an Xn setup response message, an NG-RAN configuration update acknowledgment message, a satellite connection response message, a message for acknowledging the request for satellite handover, etc. The second message may include multiple at least one of the following:

a cell ID, used to indicate a specific cell under the second entity, and may be, for example, CGI, ECGI, PCI, etc.; and random access configuration, which refers to the random access configuration information of the specific cell under the second entity, may include the configuration of the number of random access preambles and/or the configuration of random access channels, and may include, for example, at least one of the following:

the number of preambles for CBRA (Contention-Based Random Access);

the number of preambles for other requests (such as system information);

the number of preambles for CFRA (Contention-Free Random Access);

RA occasions, which refers to the number of opportunities to use PRACH resource in a unit time (such as every second), and it can be calculated by PRACH configuration index and msg1—frequency division multiplexing;

a PRACH configuration index, which can indicate the time-frequency resource configuration of PRACH; and msg1—frequency division multiplexing, used to indicate the transmission opportunities of PRACH multiplexed in frequency domain at a certain time.

After the first entity receives the random access configuration information of the specific cell in the second entity, if a large amount of UEs in the first entity need handover to the specific cell of the second entity due to reasons such as feeder link switch over in the NTN, the first entity can generate a handover decision according to the obtained random access configuration of the target cell, the number of UE in need of handover and/or the position information of the UE. The handover decision includes one or more conditions for handover (i.e., a condition handover method). Through configuring different handover conditions, access failure and delay caused by insufficient random access resources and random access conflicts can be avoided.

Another aspect of a method and a device for changing a serving entity according to an embodiment of the present disclosure has been described above in combination with FIG. 9. In FIG. 9, a signaling procedure between UE, a base station and other entities is illustrated. Additionally or alternatively, each of the entities illustrated in FIG. 9 may be replaced by another entity or a combination of entities in the existing network or a future network that can realize the same or similar functions, and any signaling (or message) transferred between the entities illustrated in FIG. 9 may be replaced by another signaling (or message) in the existing network or a future network that can realize the same or similar functions.

With the method described in combination with FIG. 9, in a case such as the change of the serving entity due to the feeder link switch over in the NTN, and thus a large amount of UEs need handover simultaneously, the handover conditions of each UE can be configured more reasonably by obtaining the random access configuration information of the target cell in advance, so that the UE can undergo the handover procedure under different conditions (such as time and angle), i.e., a large amount of UEs can initiate random access at controllable time points in a relatively scattered manner during the handover, so as to cope with the problems of insufficient random access resources or random access conflicts, thus avoiding the risk of handover failure, reducing the time delay caused by handover interruption, and thus improving the network KPI and ensuring the user experience of the service.

Figure 10:
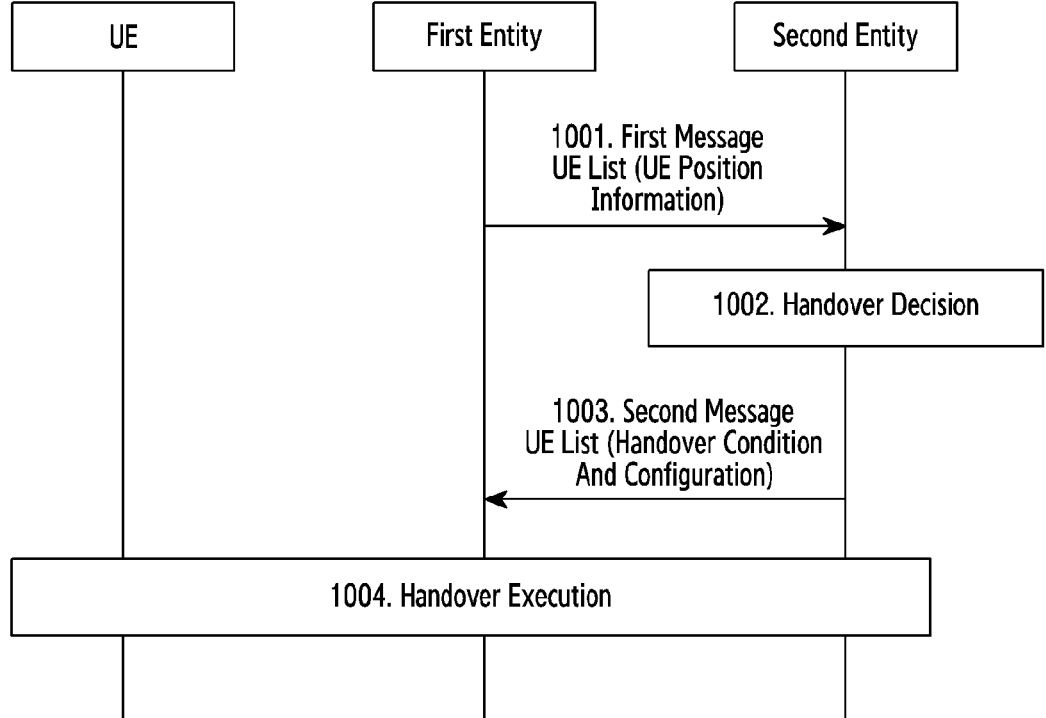
FIG. 10 illustrates an example of yet another aspect of a method and a device for changing a serving entity according to an embodiment of the present disclosure.

FIG. 10 illustrates an example of yet another aspect of a method and a device for changing a serving entity according to an embodiment of the present disclosure. A detailed description of steps unrelated to the present disclosure is omitted in the description of FIG. 10. The method comprises the following steps:

At step 1001, a first entity sends a first message to a second entity. In various implementations, the first entity and the second entity may be base stations, and the first message may be a satellite connection request message, a message for requesting satellite handover, or a message for requesting group handover preparation, etc. sent by the first base station to the second base station.

The first message may include the following information:

a serving cell list, used to indicate all cells serving the UE through a satellite under the first entity, and each item in the serving cell list may include at least one of the following;

serving cell ID, used to indicate a specific cell serving the UE through a satellite under the first entity;

serving cell configuration information, for indicating an antenna port or antenna configuration used by the specific cell, is used to infer the coverage area of the cell, so that the second entity can find or configure a cell with the same coverage area as the specific cell; and UE list, used to indicate all the UE in need of handover in the specific cell, wherein each item in the UE list may include at least one of the following:

a UE ID, used to identify specific UE in the cell, and may be, for example, GUTI; and +UE position information, which may include at least one of the following:

a beam ID, used to indicate the beam currently used by the UE under the first entity, and may be an SSB (Synchronous System Information Block) index or a CSI-RS (Channel State Indication-Reference Signal) index; and geographic coordinates, used to indicate the current actual geographic position of the UE.

At step 1002, the second entity receives the first message, makes a handover decision according to the received information and its own configuration (such as random access configuration, etc.), and generates a handover scheme for each UE, wherein the scheme may refer to, for example, the handover occasion or handover condition for each UE. If the second entity is in split architecture of the CU and the DU, the required configuration information can be obtained through the step 501 to the step 502.

At step 1003, the second entity responds a second message to the first entity. In various implementations, the second message may be a satellite connection response message, a message for acknowledging the request for satellite handover, or a message for acknowledging the request for group handover preparation. The second message may include at least one of the following:

a serving cell list, used to indicate all cells serving the UE through a satellite under the second entity, wherein the cell information indicated by each item in the serving cell list may include multiple at least one of the following:

a serving cell ID, used to indicate a specific cell connected through a satellite under the second entity; and a UE list, used to indicate all the UE in need of handover in the specific cell, and each item in the UE list may include at least one of the following:

a UE ID, used to identify specific UE in the specific cell, and may be, for example, GUTI; and UE handover configuration information, used to indicate the conditions and configuration information for the UE to initiate handover, and may include at least one of the following:

handover conditions, which may be time stamps, angles and/or geographical position area scopes; and configuration information, which may be dedicated configuration of random access, such as specific preamble sequence used by random access and/or the time-frequency resources of corresponding transmission.

After receiving the second message, the first entity performs configuration for handover preparation and handover execution to the corresponding UE according to the situation, and sends the handover conditions and configuration corresponding to each UE to the UE through an RRC message. According to the handover conditions and configuration, the UE initiates random access to the target cell when the conditions are met. According to the method of the embodiment of the disclosure, through configuring different handover conditions, the UE in the cell can be handed over at different times/under different conditions, thus avoiding access failure and delay caused by insufficient random access resources and random access conflicts.

Another aspect of a method and a device for changing a serving entity according to an embodiment of the present disclosure has been described above in combination with FIG. 10. In FIG. 10, a signaling procedure between UE, a base station and other entities is illustrated. Additionally or alternatively, each of the entities illustrated in FIG. 10 may be replaced by another entity or a combination of entities in the existing network or a future network that can realize the same or similar functions, and any signaling (or message) transferred between the entities illustrated in FIG. 10 may be replaced by another signaling (or message) in the existing network or a future network that can realize the same or similar functions.

With the method described in combination with FIG. 10, by obtaining a part of information of UE, the target entity can more reasonably configure the handover conditions of each UE according to the obtained information combined with its own resource configuration when, for example, the serving entity changes due to feeder link switch over in the NTN and thus a large amount of UEs need handover simultaneously. Therefore, the UE can initiate a handover procedure under different conditions (such as time, elevation angle between the UE and the satellite), i.e., a large amount of UEs can initiate random access at controllable time points in a relatively scattered manner during the handover, so as to avoid the problems of insufficient random access resources or random access conflicts, thus avoiding the risk of handover failure, reducing the delay caused by handover interruption, and thus improving network KPI and ensuring user experience of the service.

Figure 11:
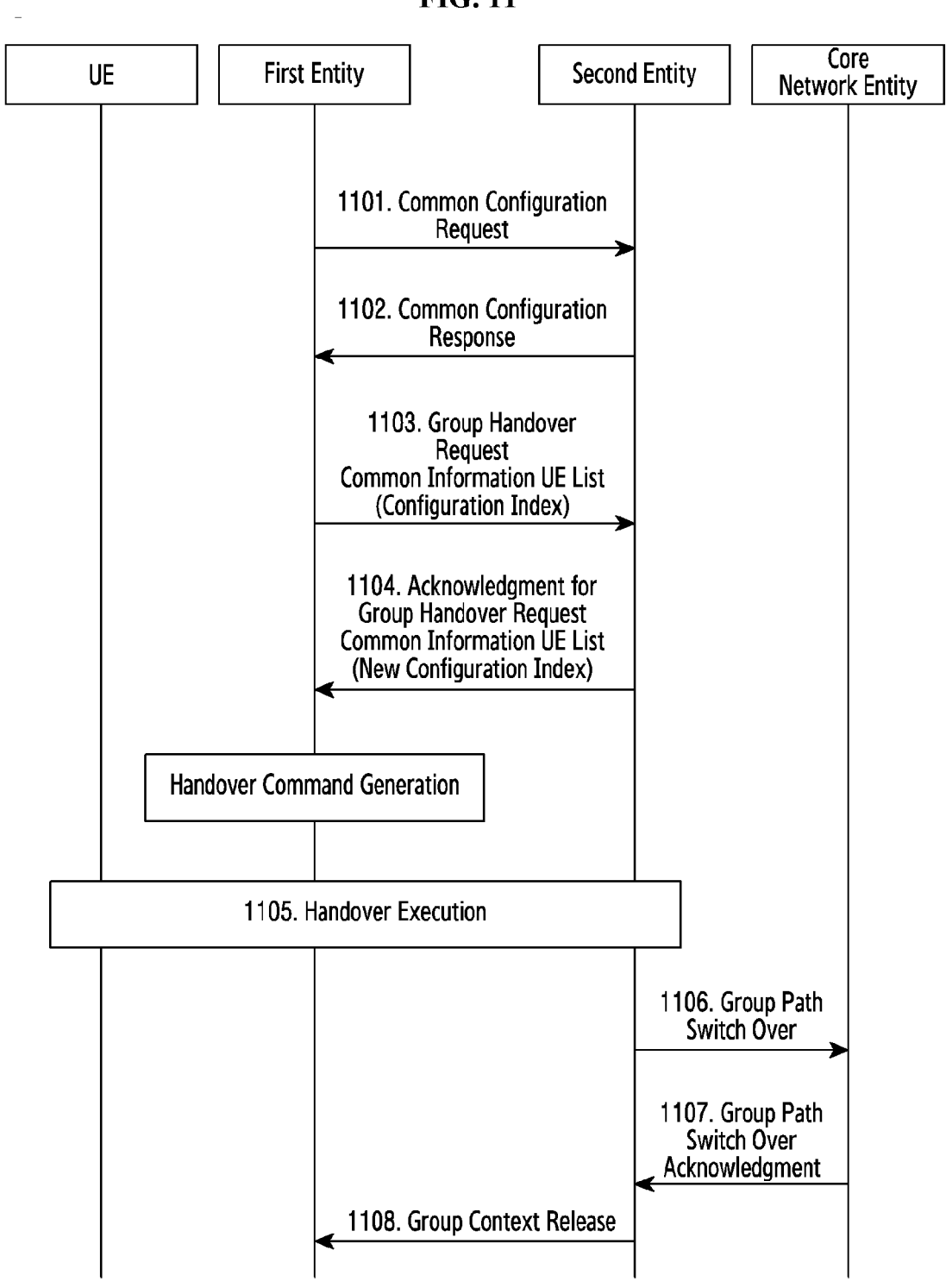
FIG. 11 illustrates an example of yet another aspect of a method and a device for changing a serving entity according to an embodiment of the present disclosure.

FIG. 11 illustrates an example of yet another aspect of a method and a device for changing a serving entity according to an embodiment of the present disclosure. A detailed description of steps unrelated to the present disclosure is omitted in the description of FIG. 11. The method comprises the following steps:

At step 1101, a first entity sends a request for common configuration to a second entity, wherein the first entity and the second entity may be base stations, and the request may be triggered, for example, because all UEs in a specific serving cell under the first entity needs to be handed over to a specific cell under the second entity simultaneously. The main purpose of sending a request for common configuration is to request common configuration information from the target cell. The message that transfers the request for common configuration may include an indication of requesting configuration, wherein the indication may indicate which layer of common configuration information to obtain. For example, it may indicate whether it is necessary to obtain common configuration information of SDAP (Service Adaptation Application Protocol), PDCP (Packet Data Convergence Protocol), RLC (Radio Link Control), MAC (Media Access Control) and/or physical layer. In various implementations, the indication may be transferred by messages such as a message for requesting common configuration, an NG-RAN configuration update message, a satellite connection request message, a message indicating preparation for satellite connection, or a message indicating preparation for group handover, etc.

The second entity receives the request for common configuration.

At step 1102, the second entity sends a response on the common configuration to the first entity, wherein the response is the configuration information in response to the request at the step 1101, and may include at least one of the following:

an RB (Radio Bearer) configuration list, which includes multiple items of RB configuration information. Each item in the RB configuration list may specifically include at least one of the following:

RB configuration index, indicating a specific RB configuration, which can be a number;

SDAP layer configuration parameters, indicating the configuration parameters of the RB in SDAP layer;

PDCP layer configuration parameters, indicating the configuration parameters of the RB in the PDCP layer;

RLC layer configuration parameters, indicating the configuration parameters of the RB in RLC layer;

MAC layer configuration parameters, indicating common configuration parameters of the MAC layer, applicable to all RBs; and physical layer configuration parameters, indicating common configuration parameters of the physical layer, applicable to all RBs.

In various implementations, the response may be transferred by messages such as a message for responding common configuration, an NG-RAN configuration update acknowledgment message, a satellite connection response message, a message for acknowledging preparation for satellite connection, or a message for acknowledging preparation for group handover, etc.

At step 1103, the first entity sends a request for group handover to the second entity. The request may include at least one of the following:

common information, such as handover timer and common configuration of the target cell, etc.;

a UE list, including all UEs that request handover, and the UE has the same source serving cell information and target serving cell information. Each item in the UE list includes at least one of the following:

an UE ID within interface, the ID uniquely identifying specific UE on the interface between the first entity and the second entity, such as an XnAP ID; and dedicated configuration parameters of the UE, wherein the context configuration information of specific UE includes all SRBs (Signaling Radio Bearer) and DRBs (Data Radio Bearer) information currently used by the UE, and may also be used to request the bearer to be established from the target cell.

In various implementations, the request for group handover may be transferred by messages such as a message for requesting group handover, a message for requesting satellite handover, or a satellite connection request message, etc.

At step 1104, the second entity sends an acknowledgment for group handover request to the first entity. The acknowledgment for group handover request may include at least one of the following:

common information; and a UE list, each item of which may include at least one of the following:

new UE ID within interface, which refers to the new ID that uniquely identifies specific UE on the interface between the first entity and the second entity, such as an XnAP ID;

new UE ID, which refers to a temporary identifier of the radio network used by the UE to access the target cell, such as C-RNTI;

a configuration index of UE bearers, which refers to an RB configuration index corresponding to all SRBs and/or DRBs requested by the UE; and UE-specific configuration, which refers to other specific configuration where the UE is not in the configuration index scope, may be information such as a logical channel ID or priority, etc.

In various implementations, the acknowledgment for group handover request may be transferred by a message for acknowledging the group handover request, a message for acknowledging the satellite handover request, or a satellite connection response message, etc.

The first entity generates a handover command for each UE according to the received information.

At step 1105, the first entity sends a handover command to the UE, and the UE performs handover according to the configuration in the command. The common part of the handover command may be transferred by system information, and the UE-specific part may be transferred by RRC reconfiguration messages.

At step 1106, when the second entity receives handover complete information of multiple UEs within a certain period of time, and the multiple UEs are connected to the same core network node, the second entity may send a message for requesting group path switch over to the core network entity, wherein the message includes common information and UE-specific information.

At step 1107, the core network sends a message for acknowledging the request for group path switch over to the second entity to indicate the success of the path switch over. The message may include a UE list, where there is new transmission network configuration information of multiple UEs.

At step 1108, the second entity sends a message for releasing group context to the first entity, to indicate the first entity to release all the UE successfully handed over, and the message may include a UE list or a release indication. If the message includes a UE list, the list is used to indicate the ID of the UE that needs to release the context; if the message includes a release indication, the indication may be 1-bit indication information used to indicate the first entity to release the context of all the UE, or may be the ID of the satellite used to indicate the first entity to release all the UE context under the satellite corresponding to the ID.

In this way, the group handover procedure can be completed. In the procedure, the common configuration information is transferred in advance, and the UE-exclusive information (e.g., UE-specific information) in the handover request and the acknowledgment is sent separately, which can save a large amount of signaling overheads when a large amount of UEs need handover from the same source cell to the same target cell (e.g., when feeder link switch over occurs in a satellite). Meanwhile, it can also generate a better handover scheme according to more comprehensive handover information to avoid the shortage and conflict of resources during simultaneous handover, thus avoiding the problems of handover failure or long interruption time caused by a large amount of UEs that need handover simultaneously, and improving the network KPI and ensuring the user experience.

An example of yet another aspect of a method and a device for changing a serving entity according to an embodiment of the present disclosure has been described above in combination with FIG. 11. In FIG. 11, a signaling procedure between a base station, a core network and other entities is illustrated. Additionally or alternatively, each of the entities illustrated in FIG. 11 may be replaced by another entity or a combination of entities in the existing network or a future network that can realize the same or similar functions, and any signaling (or message) transferred between the entities illustrated in FIG. 11 may be replaced by another signaling (or message) in the existing network or a future network that can realize the same or similar functions.

With the method described in combination with FIG. 11, when a large amount of UEs need handover simultaneously in a case such as the change of serving entity caused by feeder link switch over in the NTN, the handover policy can be reasonably formulated and the sending of repeated information can be reduced through the preparation and execution method of group handover, so as to avoid the risk of handover failure and reducing the delay caused by handover interruption, thus reducing the signaling overhead on the interface, improving the network KPI, ensuring the user experience of the service and reducing the operating cost.

Figures 12, 13:
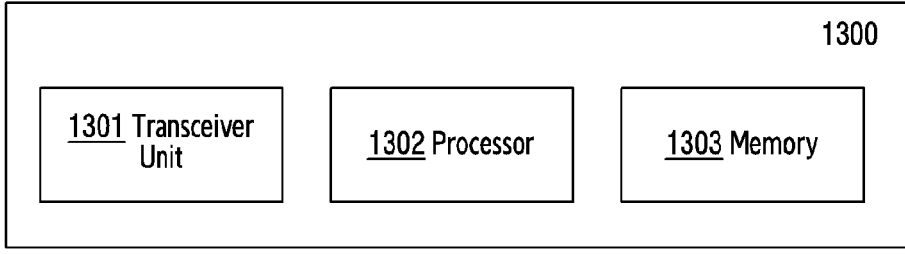
FIG. 12 illustrates an example of yet another aspect of a method and a device for changing a serving entity according to an embodiment of the present disclosure.
FIG. 13 illustrates a simplified block diagram of an example configuration of hardware components of a device for changing a serving entity according to various embodiments of the present disclosure.

FIG. 12 illustrates an example of yet another aspect of a method and a device for changing a serving entity according to an embodiment of the present disclosure. A detailed description of steps unrelated to the present disclosure is omitted in the description of FIG. 12. The method comprises the following steps:

At step 1200, the second entity sends measurement configuration to the first entity. In various implementations, the first entity may be a base station or a DU, and the second entity may be a core network node or a CU, i.e., the possible cases may be that: the measurement configuration may be transferred by a message sent by the core network to the base station or be transferred by a message sent by the CU to the DU. In various implementations, for example, the message may be an NG setup response message, an NG resume response message, an AMF configuration update message sent by the core network to the base station, or an F1 setup response message, a GNB-CU configuration update message, a GNB-DU resource cooperation request message, an F1 resume response message, or a message for satellite measurement configuration, etc. sent by the CU to the DU.

The measurement configuration may include at least one of the following:

a measurement object, used to indicate frequency point information of the signal sent by a signal transceiver on the NTN gateway that the satellite needs to measure;

a measurement event, which refers to the condition that the measured signal value needs to meet to trigger a measurement event, and the measured value may be information such as signal strength, quality and/or angle, etc., and the met condition may be an absolute value or a relative value and the time threshold for meeting the condition; and reporting configuration, which refers to the way to inform the entity that configured the measurement after the measurement event is triggered (the number of reports and/or the reporting period).

The first entity receives the measurement configuration, and reads the ID information of the third entity broadcast by the third entity after meeting the measurement event, and decides to initiate procedures involved in changing the serving entity (e.g., the feeder link switch over procedure) according to other assistance information (such as the satellite trajectory, etc.). In an example of the feeder link switch over as a procedure involved in changing the serving entity, the procedure is to switch the feeder link connection of the first entity from the second entity to the third entity, and in the following description, the feeder link switch over and the involved handover or reconfiguration procedures are described as examples, but are not limited to these. For example, the third entity may be a core network or a CU.

At step 1201a, if the procedure involved in changing the serving entity (e.g., link switch over, handover/reconfiguration, etc.) is triggered through the step 1200, the first entity sends to the second entity an indication of changing the serving entity, such as a link switch over indication, and the indication may include an measurement object, a measurement result and/or a handover/reconfiguration indication. The measurement object may include the ID information of the target entity measured, and the ID information may be in the form of a GNB ID, a DU ID, etc. In various implementations, the indication of changing the serving entity may be transferred by a measurement report message, a message for link measurement report, or a link switch over indication message sent by the base station to the core network, or be transferred by a measurement report message, a message for link measurement report, a link switch over indication message, or a message for indicating the state of the GNB-DU, etc. sent by the DU to the CU.

At step 1201b, if the first entity triggers the procedure involved in changing the serving entity (e.g., link switch over, handover/reconfiguration, etc.) through its own measurement and configuration, which is inferred from, for example, trajectory prediction and/or position information of the NTN gateway, then the first entity detects the connection with the third entity, and when the measurement conditions are met (such as good signal quality and/or coverage angle reaching a certain threshold), the first entity initiates a procedure of connection setup or connection resume to the third entity. In the procedure, the first entity sends the ID information of the connected second entity (i.e., the source entity ID) and/or the ID information of the specific cell under the serving second entity (i.e., the source serving cell ID) to the third entity. In various implementations, the above information may be transferred by an NG setup request message and an NG resume request message sent by the base station to the core network, or an F1 setup request message and an F1 resume request message sent by the DU to the CU.

At step 1202, if the procedure of step 1201b is implemented at the step 1201, the third entity sends, for example, a link switch over indication to the second entity according to the source entity ID (i.e., the second entity ID) to indicate the second entity to initiate the preparation and execution procedure for changing the serving entity corresponding to the link switch over.

At step 1203, initiating, by the second entity, the preparation and execution procedure of handover or reconfiguration to the third entity according to the indication of the step 1201a or the step 1202.

In this way, the second entity can timely and accurately receive the indication of the need to perform link switch over and the information of the target entity of the link switch over.

Another aspect of a method and a device for changing a serving entity according to an embodiment of the present disclosure has been described above in combination with FIG. 12. FIG. 12 illustrates a signaling procedure among a core network, a base station, a DU and a CU.

Additionally or alternatively, each of the entities illustrated in FIG. 12 may be replaced by another entity or a combination of entities in the existing network or a future network that can realize the same or similar functions, and any signaling (or message) transferred between the entities illustrated in FIG. 12 may be replaced by another signaling (or message) in the existing network or a future network that can realize the same or similar functions.

With the method described in combination with FIG. 12, a ground entity connected to a satellite can discover the requirement of changing the serving entity (e.g., link switch over) and obtain information of the target entity of link switch over in time in a case such as satellite movement and link quality change, so that the UE on the source entity can access the target entity through handover or reconfiguration in time, thus ensuring the user experience of the UE.

FIG. 13 illustrates a simplified block diagram of an example configuration of hardware components of a device 1300 for changing a serving entity according to various embodiments of the present disclosure, and the device for changing the serving entity can implement the method for changing the serving entity according to various embodiments of the present disclosure.

The device for changing the serving entity may be implemented in any device that can perform relevant steps in the method for changing the serving entity according to the present disclosure. As a non-limiting example, the device for changing the serving entity may be implemented, for example, in network nodes such as a base station, user equipment, a core network, a CU, a DU, a satellite, etc., or be implemented in any similar devices.

As is illustrated in FIG. 13, the device 1300 for changing the serving entity includes a transceiver unit 1301, a processor 1302 and a memory 1303.

The transceiver unit 1301 is configured to receive and/or send signals.

The processor 1302 is operably connected to a transceiver unit 13501 and the memory 1303. The processor 1302 may be implemented as one or more processors for operating according to the method for changing the serving entity described in various embodiments of the present disclosure.

The memory 1303 is configured to store data. The memory 1303 may include a non-transitory memory for storing operations and/or code instructions that can be executed by the processor 1302. The memory 1303 may include a processor-readable non-transitory instruction that, when executed, causes the processor 1302 to implement the steps of the method for changing the serving entity according to various embodiments of the present disclosure. The memory 1303 may also include a random access memory or buffer (s) to store intermediate processing data from various functions executed by the processor 1302.

According to various embodiments, a method for changing a serving entity, comprising, sending, by a first entity, a first message to a second entity, receiving, by the first entity, a second message from the second entity and sending, by the first entity, a third message to UE.

In some embodiments, the first message includes timing advance (TA) assistance information and/or user equipment (UE) position information, the second message includes TA offset information for handover of the UE to the second entity determined based on the TA assistance information and/or the UE position information and the third message includes the TA offset information.

In some embodiments, the TA assistance information includes at least one of: a feeder link delay about the first entity, geographic position information of a non-terrestrial access network (NTN) gateway connected to the first entity, information for indicating the UE of a TA value of the first entity, a time stamp corresponding to the TA assistance information; and the UE position information includes at least one of: a beam identifier (ID) used by the UE under the first entity, and information indicating geographic position of the UE and the corresponding time stamp.

In some embodiments, the first message further includes at least one of power control information and frequency offset information and the second message further includes TPC and/or frequency offset information about the second entity determined based on at least one of the power control information and the frequency offset information.

In some embodiments, the power control information includes a Power Headroom Report (PHR) or a received power spectral density.

In some embodiments, the first message is one of: a satellite connection request message, a handover request message, a handover required message, a UE context modification required message, an uplink RRC message transfer message, the second message is one of: satellite connection response message transfer, handover request acknowledgment message, and UE context modification request message and the third message is a message including a handover command or a system information.

In some embodiments, the method further comprises sending, by the first entity, the first message including the TA assistance information and/or the user equipment (UE) position information to the second entity, comprising receiving, by the first entity, a fourth message including the timing advance (TA) assistance information or the user equipment (UE) position information from a secondary node and sending, by the first entity, the first message to the second entity.

In some embodiments, the fourth message is a changing secondary node required message, the first message is a secondary node addition request, and the second message is an acknowledgment for the secondary node addition request.

In some embodiments, the TA assistance information is obtained through the following steps: sending, by a central control entity (CU) corresponding to the first entity, a request for the TA assistance information to a distributed entity (DU) corresponding to the first entity and receiving, by the CU, response of the TA assistance information from the DU.

In some embodiments, the first message includes a random access configuration request, the second message includes a random access configuration of the second entity, and the third message includes handover conditions based on the random access configuration of the second entity, and the handover conditions are determined by the first entity based on the random access configuration of the second entity.

In some embodiments, the random access configuration includes at least one of: a number of preambles for Contention-Based Random Access (CBRA); a number of preambles for system information; a number of preambles for Contention Free Random access (CFRA); random access (RA)

occasions; PRACH configuration indexes; msg1—frequency division multiplexing.

In some embodiments, the first message includes a first list indicating position information of one or more UE, the second message includes a second list of handover conditions for each of the one or more UE, and the third message is used to indicate the handover conditions included in the second list, and the handover conditions are determined by the second entity based on the random access configuration of the second entity and the position information of the UE.

In some embodiments, the position information includes the beam ID used by the UE under the first entity and/or the geographic position information of the UE.

In some embodiments, the second list further includes random access configuration information of each UE, and the third message is further used to indicate random access configuration information of each UE included in the second list.

In some embodiments, the first message is one of: an Xn setup request message, an NG-RAN configuration update message, a satellite connection request message, a message for requesting satellite handover, or a message for requesting group handover preparation and the second message is one of: an Xn setup response message, an NG-RAN configuration update acknowledgment message, a satellite connection response message, a message for acknowledging a request for satellite handover, or a message for acknowledging a request for group handover preparation.

In some embodiments, the first message includes a list of serving cells and a request for the TA assistance information of the second entity, and the list of serving cells includes coverage configuration information of one or more serving cells of the first entity, the second message is used to respond the TA assistance information of the second entity to the first entity and the third message includes TA offset information common to the UE determined based on the received second message.

In some embodiments, the TA assistance information includes information indicating a feeder link delay between the second entity and a third entity connected to the first entity, or position information of an NTN gateway connected to the second entity.

In some embodiments, the first message is a satellite connection request message or a message for requesting satellite handover, the second message is a satellite connection response message or a message for acknowledging a request for satellite handover; and the third message is a system information.

In some embodiments, the first message includes a request for common configuration information of a layer of the second entity, and the second message includes response on the common configuration information of the second entity, and the method further comprises, sending, by the first entity, a fourth message including a first list of UEs requesting handover to the second entity, receiving, by the first entity, a fifth message including a second list of the UEs requesting handover from the second entity and sending, by the first entity, configuration information specific to each UE of the UEs requesting handover determined based on the received fourth message to the each UE.

According to various embodiments, A device for changing a serving entity, comprising: a transceiver configured to receive signals and send signals, a memory configured to store data and instructions and a controller configured to execute the method according to any one of the preceding methods.

Those of ordinary skill in the art will recognize that the description of the method and the device for changing the serving entity is only illustrative and is not intended to be limiting in any way. Other embodiments will readily occur to those of ordinary skill in the art who benefit from this disclosure.

For the sake of clarity, not all conventional features of embodiments of the method and the device for changing the serving entity are illustrated and described. Of course, it should be understood that in the development of any such actual implementation for the method and the device for changing the serving entity, in order to achieve specific goals of developers, for example, goals to conforms to the constraints related to applications, systems, networks and businesses, many decisions specific to the implementation may be needed, and these specific goals will change with different implementations and different developers.

The modules, processing operations and/or data structures described according to the present disclosure may be implemented using various types of operating systems, computing platforms, network devices, computer programs and/or general-purpose machines. In addition, those of ordinary skill in the art will recognize that less general-purpose devices, such as hardwired devices, Field Programmable Gate Arrays (FPGA), Application Specific Integrated Circuits (ASIC), etc., may also be used. In case a method including a series of operations and sub-operations is implemented by a processor, a computer or a machine, and those operations and sub-operations can be stored as a series of non-transitory code instructions readable by the processor, the computer or the machine, those operations and sub-operations can be stored on tangible and/or non-transient media.

The modules of the method and the device for changing the serving entity described herein may include software, firmware, hardware or any combination (s) of software, firmware or hardware suitable for the purposes described herein.

In the method for changing the serving entity described herein, various operations and sub-operations may be executed in various orders, and some of the operations and sub-operations may be optional.

Although the foregoing disclosure of this application has been made with non-limiting illustrative embodiments, these embodiments may be arbitrarily modified within the scope of the appended claims without departing from the spirit and essence of the disclosure.

The invention claimed is:

1. A method performed by a first base station, the method comprising:

identifying that a switch of a feeder link associated with the first base station is triggered;

transmitting, to a second base station, a first message for a handover from a first cell of the first base station to a second cell of the second base station, wherein the first message includes first information on a first frequency compensation value of the first cell, and timing advance (TA) assistance information including second information on a first TA value of the first cell;

receiving, from the second base station, a second message as a response to the first message, wherein the second message includes information on a second frequency compensation value of the second cell, and information on a TA offset between the first TA value and a second TA value of the second cell; and transmitting, to a user equipment (UE), a third message including the first information on the TA offset, wherein the second frequency compensation value is based on the first frequency compensation value, and wherein the TA offset for the second cell is based on the first TA value of the first cell.

2. The method of claim 1, wherein the first message further includes position information of the UE associated with the handover, and wherein an allocation of an uplink grant for the UE is based on the position information.

3. The method of claim 2, wherein the TA assistance information includes information on a feeder link delay associated with the first base station, geographic position information of a non-terrestrial access network (NTN) gateway connected to the first base station, and information on a time stamp corresponding to the TA assistance information, and wherein the position information includes at least one of information on a beam identifier (ID) of the UE, or information indicating a geographic position of the UE.

4. The method of claim 2, wherein the first message further includes power control information, wherein the second message further includes transmit power control (TPC) information, wherein the TPC information is based on the power control information, and wherein the power control information includes a power headroom report (PHR) or a received power spectral density.

5. The method of claim 1, wherein the first message is one of: a satellite connection request message, a handover request message, a handover required message, a UE context modification required message, or an uplink radio resource control (RRC) message transfer message, wherein the second message is one of: satellite connection response message, handover request acknowledgment message, or UE context modification request message, and wherein the third message is a message including a handover command or system information.

6. The method of claim 1, wherein the first base station corresponds to a master node (MN) and the second base station corresponds to a secondary node (SN), wherein the method further comprises: receiving, from a third base station corresponding to the SN, a fourth message including the TA assistance information, and wherein the fourth message is a changing secondary node required message, the first message is a secondary node addition request, and the second message is an acknowledgment for the secondary node addition request.

7. A first base station comprising: at least one transceiver; at least one processor communicatively coupled to the at least one transceiver; and at least one memory, communicatively coupled to the at least one processor, storing instructions executable by the at least one processor individually or in any combination to cause the first base station to: identify that a switch of a feeder link associated with the first base station is triggered, transmit, to a second base station, a first message for a handover from a first cell of the first base station to a second cell of the second base station, wherein the first message includes first information on a first frequency compensation value of the first cell, and timing advance (TA) assistance information including second information on a first TA value of the first cell, receive, from the second base station, a second message as a response to the first message, wherein the second message includes information on a second frequency compensation value of the second cell, and information on a TA offset between the first TA value and a second TA value of the second cell, and transmit, to a user equipment (UE), a third message including the information on the TA offset, wherein the second frequency compensation value is based on the first frequency compensation value, and wherein the TA offset for the second cell is based on the first TA value of the first cell.

8. The first base station of claim 7, wherein the first message further includes position information of the UE associated with the handover, and wherein an allocation of an uplink grant for the UE is based on the position information.

9. The first base station of claim 8, wherein the TA assistance information includes information on a feeder link delay associated with the first base station, geographic position information of a non-terrestrial access network (NTN) gateway connected to the first base station, and information on a time stamp corresponding to the TA assistance information; and wherein the position information includes at least one of information on a beam identifier (ID) of the UE, or information indicating a geographic position of the UE.

10. The first base station of claim 8, wherein the first message further includes power control information, wherein the second message further includes transmit power control (TPC) information, wherein the TPC information is based on the power control information, and wherein the power control information includes a power headroom report (PHR) or a received power spectral density.

11. The first base station of claim 7, wherein the first message is one of: a satellite connection request message, a handover request message, a handover required message, a UE context modification required message, or an uplink radio resource control (RRC) message transfer message, wherein the second message is one of: satellite connection response message, handover request acknowledgment message, or UE context modification request message, and wherein the third message is a message including a handover command or system information.

12. The first base station of claim 7, wherein the first base station corresponds to a master node (MN) and the second base station corresponds to a secondary node (SN), wherein the instructions further cause the first base station to: receive, from a third base station corresponding to the SN, a fourth message including the TA assistance information, and wherein the fourth message is a changing secondary node required message, the first message is a secondary node addition request, and the second message is an acknowledgment for the secondary node addition request.

13. A method performed by a second base station, the method comprising: receiving, from a first base station, a first message for a handover from a first cell of the first base station to a second cell of the second base station, based on a switch of a feeder link associated with the first base station being triggered, wherein the first message includes first information on a first frequency compensation value of the first cell, and timing advance (TA) assistance information including second information on a first TA value of the first cell;

identifying a second frequency compensation value of the second cell, based on the first frequency compensation value;

identifying a TA offset between the first TA value and a second TA value of the second cell, based on the first TA value; and transmitting, to the first base station, a second message as a response to the first message, wherein the second message includes information on the second frequency compensation value of the second cell, and information on the TA offset for the second cell.

14. The method of claim 13, wherein the first message further includes position information of a user equipment (UE) associated with the handover, and wherein an uplink grant for the UE is allocated based on the position information.

15. The method of claim 14, wherein the TA assistance information includes information on a feeder link delay associated with the first base station, geographic position information of a non-terrestrial access network (NTN) gateway connected to the first base station, and information on a time stamp corresponding to the TA assistance information, and wherein the position information includes at least one of information on a beam identifier (ID) of the UE, or information indicating a geographic position of the UE.

16. The method of claim 14, wherein the first message further includes power control information, wherein the second message further includes transmit power control (TPC) information, wherein the TPC information is based on the power control information, and wherein the power control information includes a power headroom report (PHR) or a received power spectral density.

17. A second base station comprising:

at least one transceiver;

at least one processor communicatively coupled to the at least one transceiver; and at least one memory, communicatively coupled to the at least one processor, storing instructions executable by the at least one processor individually or in any combination to cause the second base station to:

receive, from a first base station, a first message for a handover from a first cell of the first base station to a second cell of the second base station, based on a switch of a feeder link associated with the first base station being triggered, wherein the first message includes first information on a first frequency compensation value of the first cell, and timing advance (TA) assistance information including second information on a first TA value of the first cell, identify a second frequency compensation value of the second cell, based on the first frequency compensation value, identify a TA offset between the first TA value and a second TA value of the second cell, based on the first TA value, and transmit, to the first base station, a second message as a response to the first message, wherein the second message includes information on the second frequency compensation value of the second cell, and information on the TA offset for the second cell.

18. The second base station of claim 17, wherein the first message further includes position information of a user equipment (UE) associated with the handover, and wherein an uplink grant for the UE is allocated based on the position information.

19. The second base station of claim 18, wherein the TA assistance information includes information on a feeder link delay associated with the first base station, geographic position information of a non-terrestrial access network (NTN) gateway connected to the first base station, and information on a time stamp corresponding to the TA assistance information, and wherein the position information includes at least one of information on a beam identifier (ID) of the UE, or information indicating a geographic position of the UE.

20. The second base station of claim 18, wherein the first message further includes power control information, wherein the second message further includes transmit power control (TPC) information, wherein the TPC information is based on the power control information, and wherein the power control information includes a power headroom report (PHR) or a received power spectral density.

\* \* \* \* \*